US012701072B2

(12) United States Patent
Kommula et al.

(10) Patent No.: US 12,701,072 B2
(45) Date of Patent: Aug. 4, 2026

(54) SERVICE AWARE ROUTING USING NETWORK INTERFACE CARDS HAVING PROCESSING UNITS

(71) Applicant: Juniper Networks, Inc., Sunnyvale, CA (US)

(72) Inventors: Raja Kommula, Cupertino, CA (US); Kiran K N, Bangalore (IN); Yuvaraja Mariappan, San Jose, CA (US); Thayumanavan Sridhar, Sunnyvale, CA (US); Raj Yavatkar, Los Gatos, CA (US); Vikram Singh, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 110 days.

(21) Appl. No.: 17/809,507

(22) Filed: Jun. 28, 2022

(65) Prior Publication Data

US 2023/0020114 A1 Jan. 19, 2023

(30) Foreign Application Priority Data

Jun. 30, 2021 (IN) .............................. 202141029401

(51) Int. Cl.
*H04L 45/12* (2022.01)
*H04L 12/46* (2006.01)
(Continued)

(52) U.S. Cl.
CPC ........ *H04L 45/124* (2013.01); *H04L 12/4633* (2013.01); *H04L 45/02* (2013.01);
(Continued)

(58) Field of Classification Search
CPC ..... H04L 12/4633; H04L 45/02; H04L 45/34; H04L 47/822; H04L 69/22; H04L 2212/00
See application file for complete search history.

(56) References Cited

U.S. PATENT DOCUMENTS 6,678,283 B1 * 1/2004 Teplitsky ................ H04L 45/60
726/13
8,750,288 B2 6/2014 Nakil
(Continued)

FOREIGN PATENT DOCUMENTS

CN 105262615 A 1/2016
EP 3716533 A1 9/2020
(Continued)

OTHER PUBLICATIONS

Yavatkar, "Extending the Edge of the Network with Juniper Edge Services Platform (JESP)", (https://blogs.juniper.net/en-us/engineering-simplicity/extending-the-edge-of-the-network-with-juniper-edge-services-platform-jesp), Juniper Networks, Inc., Nov. 10, 2021, 3 pp.

(Continued)

*Primary Examiner* — Chris Parry
*Assistant Examiner* — Dixon F Dabipi
(74) *Attorney, Agent, or Firm* — Shumaker & Sieffert P.A.

(57) ABSTRACT

An example method comprises, receiving resource availability values from the plurality of Network Interface Cards (NICs); determining a data path for data packets of a flow transported using a protocol from a source NIC to a destination NIC via a NIC set that comprises at least one NIC, wherein: the plurality of NICs comprises the source NIC, the destination NIC, and the NIC set, and determining the data path comprises selecting the NIC set based on the resource availability values; and transmitting, to the source NIC and (Continued)

to each NIC in the NIC set, data path data to cause the source NIC and each NIC in the NIC set to identify the data packets of the flow using an identifier of the protocol and to transmit the data packets of the flow from the source NIC to the destination NIC via the data path.

20 Claims, 23 Drawing Sheets

(51) Int. Cl.

| | |
|---|---|
| H04L 45/00 | (2022.01) |
| H04L 45/02 | (2022.01) |
| H04L 45/302 | (2022.01) |
| H04L 45/42 | (2022.01) |
| H04L 47/70 | (2022.01) |
| H04L 47/78 | (2022.01) |
| H04L 49/00 | (2022.01) |
| H04L 69/08 | (2022.01) |
| H04L 69/22 | (2022.01) |

(52) U.S. Cl.
    CPC ............ *H04L 45/20* (2013.01); *H04L 45/302* (2013.01); *H04L 45/34* (2013.01); *H04L 45/42* (2013.01); *H04L 47/781* (2013.01); *H04L 47/822* (2013.01); *H04L 49/30* (2013.01); *H04L 69/08* (2013.01); *H04L 69/22* (2013.01); *H04L 2212/00* (2013.01)

(56) References Cited

U.S. PATENT DOCUMENTS

| | | | | |
|---|---|---|---|---|
| 9,130,867 | B2 | 9/2015 | Karina | |
| 9,571,394 | B1* | 2/2017 | Sivaramakrishnan | .. H04L 49/70 |
| 9,654,396 | B2 | 5/2017 | Kothari | |
| 9,973,390 | B2 | 5/2018 | Bhatia | |
| 10,484,265 | B2 | 11/2019 | Wu | |
| 10,560,431 | B1 | 2/2020 | Chen | |
| 10,756,967 | B2 | 8/2020 | Kommula | |
| 10,997,106 | B1* | 5/2021 | Bandaru | ............... G06F 13/385 |
| 11,588,757 | B2 | 2/2023 | Arad | |
| 11,936,554 | B2 | 3/2024 | Kommula et al. | |
| 12,470,474 | B2 | 11/2025 | Kommula et al. | |
| 2007/0070937 | A1* | 3/2007 | Demirhan | ........... H04W 72/563 |
| | | | | 370/328 |
| 2011/0085568 | A1 | 4/2011 | Gnanasekaran | |
| 2012/0170477 | A1 | 7/2012 | Hieda | |
| 2013/0242718 | A1 | 9/2013 | Zhang | |
| 2013/0332602 | A1 | 12/2013 | Nakil | |
| 2014/0098673 | A1 | 4/2014 | Lee | |
| 2015/0029848 | A1* | 1/2015 | Jain | .................... H04L 47/6215 |
| | | | | 370/235 |
| 2015/0244617 | A1 | 8/2015 | Nakil | |
| 2015/0277953 | A1* | 10/2015 | Xu | ...................... G06F 9/45558 |
| | | | | 718/1 |
| 2016/0330080 | A1 | 11/2016 | Bhatia | |
| 2016/0378401 | A1* | 12/2016 | Savic | ................... G06F 3/0608 |
| | | | | 710/74 |
| 2017/0048154 | A1 | 2/2017 | Fung | |
| 2017/0324645 | A1 | 11/2017 | Johnsen | |
| 2018/0052702 | A1* | 2/2018 | Kaplan | ............... G06F 9/45558 |
| 2018/0109471 | A1* | 4/2018 | Chang | .................... H04L 49/70 |
| 2020/0007383 | A1 | 1/2020 | Efraim | |
| 2020/0278892 | A1 | 9/2020 | Nainar et al. | |
| 2020/0328989 | A1 | 10/2020 | Lambeth | |
| 2022/0217094 | A1* | 7/2022 | Hewson | ................. H04L 47/20 |
| 2022/0232073 | A1 | 7/2022 | Kuttuva Jeyaram | |
| 2022/0255857 | A1 | 8/2022 | Li et al. | |
| 2023/0171178 | A1 | 6/2023 | Gamage et al. | |

FOREIGN PATENT DOCUMENTS

| | | | |
|---|---|---|---|
| WO | 2013184846 | A1 | 12/2013 |
| WO | 2016210017 | A1 | 12/2016 |
| WO | 2020/236272 | A1 | 11/2020 |
| WO | 2021206864 | A1 | 10/2021 |

OTHER PUBLICATIONS

U.S. Appl. No. 17/806,865, filed Jun. 14, 2022 naming inventors Kommula et al.

Response to Extended Search Report dated Dec. 13, 2023, from counterpart European Application No. 23200669.2 filed Jul. 10, 2024, 54 pp.

Le et al., "UNO : uniflying host and smart NIC offload for flexible packet processing", Proceedings of the 2017 Symposium on Cloud Computing, SOCC '17,, Sep. 27, 2017, pp. 506-519.

Liu et al., "E3: Energy-Efficient Microservices on SmartNIC-Accelerated Servers", Usenix, the Advanced Computing Systems Association, Jul. 10, 2019, pp. 1-17.

Extended Search Report from counterpart European Application No. 23200209.7 dated Dec. 18, 2023, 11 pp.

Extended Search Report from counterpart European Application No. 23200669.2 dated Dec. 13, 2023, 13 pp.

International Preliminary Report on Patentability from International Application No. PCT/US2022/073295 dated Jan. 11, 2024, 16 pp.

International Search Report and Written Opinion received for PCT Patent Application No. PCT/US2022/073295, mailed on Dec. 1, 2022, 20 pages.

Invitation to Pay Additional Fees and, Where Applicable, Protest Fee from International Application No. PCT/US2022/073295 dated Oct. 10, 2022, 13 pp.

Prosecution History from U.S. Appl. No. 17/809,452, dated Jan. 15, 2025 through Aug. 21, 2025, 47 pp.

Response to Communication Pursuant to Rules 161(1) and 162 EPC dated Oct. 6, 2023, from counterpart European Application No. 22755371.6, filed Apr. 2, 2024, 44 pp.

* cited by examiner

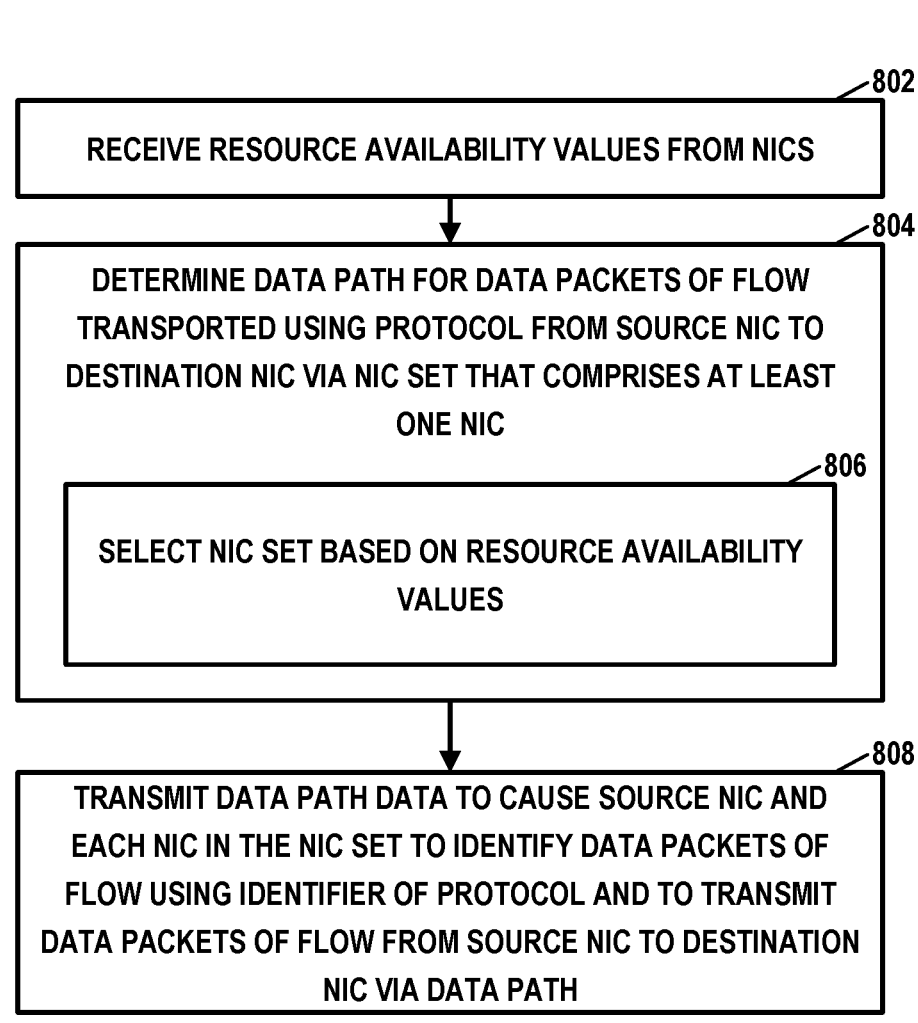

_800_

_802_

RECEIVE RESOURCE AVAILABILITY VALUES FROM NICS

_804_

DETERMINE DATA PATH FOR DATA PACKETS OF FLOW TRANSPORTED USING PROTOCOL FROM SOURCE NIC TO DESTINATION NIC VIA NIC SET THAT COMPRISES AT LEAST ONE NIC

_806_

SELECT NIC SET BASED ON RESOURCE AVAILABILITY VALUES

_808_

TRANSMIT DATA PATH DATA TO CAUSE SOURCE NIC AND EACH NIC IN THE NIC SET TO IDENTIFY DATA PACKETS OF FLOW USING IDENTIFIER OF PROTOCOL AND TO TRANSMIT DATA PACKETS OF FLOW FROM SOURCE NIC TO DESTINATION NIC VIA DATA PATH

TRANSMIT RESOURCE AVAILABILITY VALUE FOR NIC TO EDGE SERVICES CONTROLLER

904

RECEIVE DATA PATH DATA ASSOCIATED WITH DATA PATH FOR DATA PACKETS OF FLOW

906

RECEIVE DATA PACKET OF FLOW

908

MAP, BASED ON DATA PATH DATA, DATA PACKET TO FLOW IDENTIFIER OF FLOW

910

OUTPUT, BASED ON DATA PATH DATA AND FLOW IDENTIFIER OF FLOW, DATA PACKET VIA THE NIC PORT

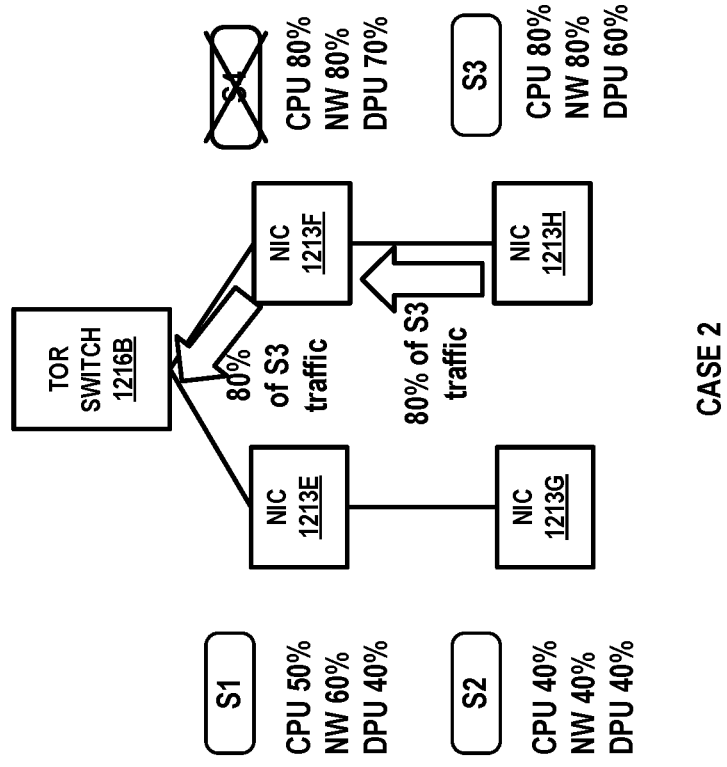
CASE 2
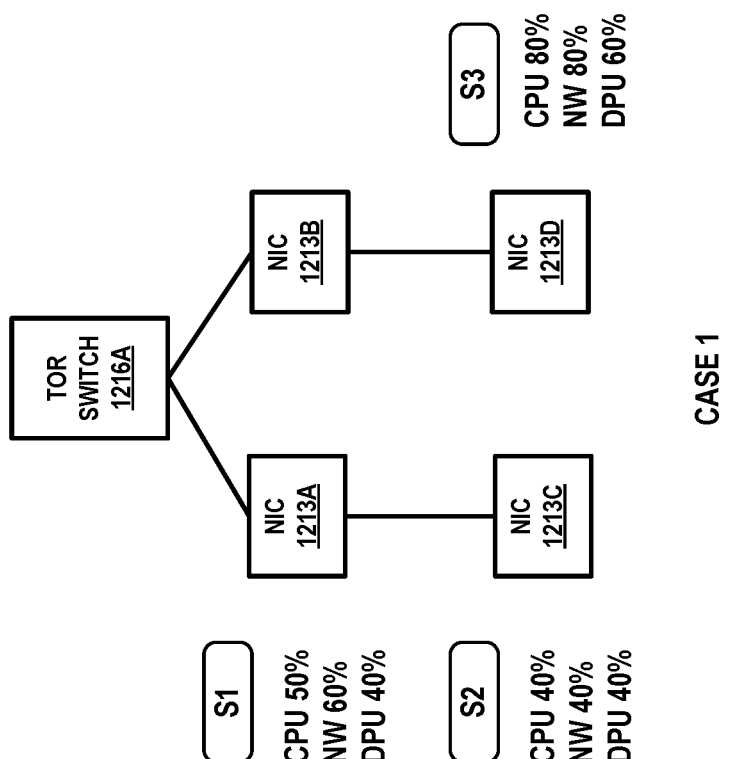
CASE 1
FIG. 12

2400

2402

RECEIVE, AT FIRST NETWORK INTERFACE OF NIC, DATA PACKET FROM PHYSICAL DEVICE

2404

BASED ON DATA PACKET BEING RECEIVED AT FIRST NETWORK INTERFACE, MODIFY DATA PACKET TO GENERATE MODIFIED DATA PACKET

2406

OUTPUT MODIFIED DATA PACKET TO PHYSICAL DEVICE VIA SECOND NETWORK INTERFACE OF NIC

SERVICE AWARE ROUTING USING NETWORK INTERFACE CARDS HAVING PROCESSING UNITS

This application claims the benefit of India Patent Application No. 202141029401, filed Jun. 30, 2021, and entitled "EDGE SERVICES USING NETWORK INTERFACE CARDS HAVING PROCESSING UNITS," the entire content of which is incorporated by reference herein.

TECHNICAL FIELD

The disclosure relates to computer networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of a data center provider. The data center may, for example, host all of the infrastructure equipment, such as networking and storage systems, redundant power supplies, and environmental controls. In a typical data center, clusters of storage servers and application servers (compute nodes) are interconnected via a high-speed switch fabric provided by one or more tiers of physical network switches and routers. More sophisticated data centers provide infrastructure spread throughout the world with subscriber support equipment located in various physical hosting facilities.

The connectivity between the server and the switch fabric occurs at a hardware module called the Network Interface Card (NIC). A conventional NIC includes an application-specific integrated circuit (ASIC) to perform packet forwarding, which includes some basic Layer 2/Layer 3 (L2/L3) functionality. In conventional NICs, the packet processing, policing and other advanced functionality, known as the "datapath," is performed by the host CPU, i.e., the CPU of the server that includes the NIC. As a result, the CPU resources in the server are shared by applications running on that server and also by datapath processing. For example, in a 4 core x86 server, one of the cores may be reserved for the datapath, leaving 3 cores (or 75% of CPU) for applications and the host operating system.

Some NIC vendors have begun including an additional processing unit in the NIC itself to offload at least some of the datapath processing from the host CPU to the NIC. The processing unit in the NIC may be, e.g., a multi-core ARM processor with some hardware acceleration provided by a Data Processing Unit (DPU), Field Programmable Gate Array (FPGA), and/or an ASIC. NICs that include such augmented datapath processing capabilities are typically referred to as SmartNICs.

SUMMARY

In general, techniques are described for an edge services platform that leverages processing units of NICs to augment the processing and networking functionality of a network of servers that include the NICs. Features provided by the edge services platform may include, e.g., orchestration of NICs; API driven deployment of services on NICs; NIC addition, deletion and replacement; monitoring of services and other resources on NICs; and management of connectivity between various services running on the NICs. More specifically, this disclosure describes techniques for dynamically deploying services on computing devices in a NIC fabric, techniques for dynamically generating virtual topologies in NIC fabrics, techniques for routing data packets in a NIC fabric based on applications, and techniques for extending the functionality of switch fabric using processor-equipped NICs.

In one example, this disclosure describes a method comprising: receiving, at an edge services controller that manages data packet routing in a network interface card (NIC) fabric comprising a plurality of NICs coupled by communication links in a NIC fabric topology, resource availability values from the plurality of NICs; determining, by the edge services controller, a data path for data packets of a flow transported using a protocol from a source NIC to a destination NIC via a NIC set that comprises at least one NIC, wherein: the plurality of NICs comprises the source NIC, the destination NIC, and the NIC set, and determining the data path comprises selecting the NIC set based on the resource availability values; and transmitting, by the edge services controller to the source NIC and to each NIC in the NIC set, data path data to cause the source NIC and each NIC in the NIC set to identify the data packets of the flow using an identifier of the protocol and to transmit the data packets of the flow from the source NIC to the destination NIC via the data path.

In another example, this disclosure describes a network interface card (NIC) comprising: a NIC port; a processor; and a memory comprising instructions that, when executed by the processor, cause the NIC to: transmit a resource availability value of the NIC to an edge services controller; receive, from the edge services controller, data path data associated with a data path for data packets of a flow transported using a protocol from a source NIC in a NIC fabric to a destination NIC in the NIC fabric, wherein the data path is computed using the resource availability value of the NIC and the data path data comprises a flow identifier of the flow mapped to a next-hop port identifier of the NIC port; receive a data packet of the flow; map, based on the data path data, the data packet to the flow identifier of the flow; and output, based on the data path data and the flow identifier of the flow, the data packet via the NIC port.

In another example, this disclosure describes a system comprising: a network interface card (NIC) fabric comprising a plurality of NICs coupled by communication links in a NIC fabric topology; and an edge services controller that manages data packet routing in the NIC fabric, the edge services controller configured to: receive resource availability values from the plurality of NICs; determine a data path for data packets of a flow transported using a protocol from a source NIC to a destination NIC via a NIC set that comprises at least one NIC, wherein: the plurality of NICs comprises the source NIC, the destination NIC, and the NIC set, and the edge services controller is configured to select the NIC set based on the resource availability values; and transmit, to the source NIC and to each NIC in the NIC set, data path data to cause the source NIC and each NIC in the NIC set to identify the data packets of the flow using an identifier of the protocol and to transmit the data packets of the flow from the source NIC to the destination NIC via the data path.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

FIG. 8 is a flowchart for an example method performed by an edge services controller, according to techniques of this disclosure.

FIG. 12 is a conceptual diagram illustrating an example of resource overcounting in a network.

Like reference characters denote like elements throughout the description and figures.

DETAILED DESCRIPTION

Figure 1:
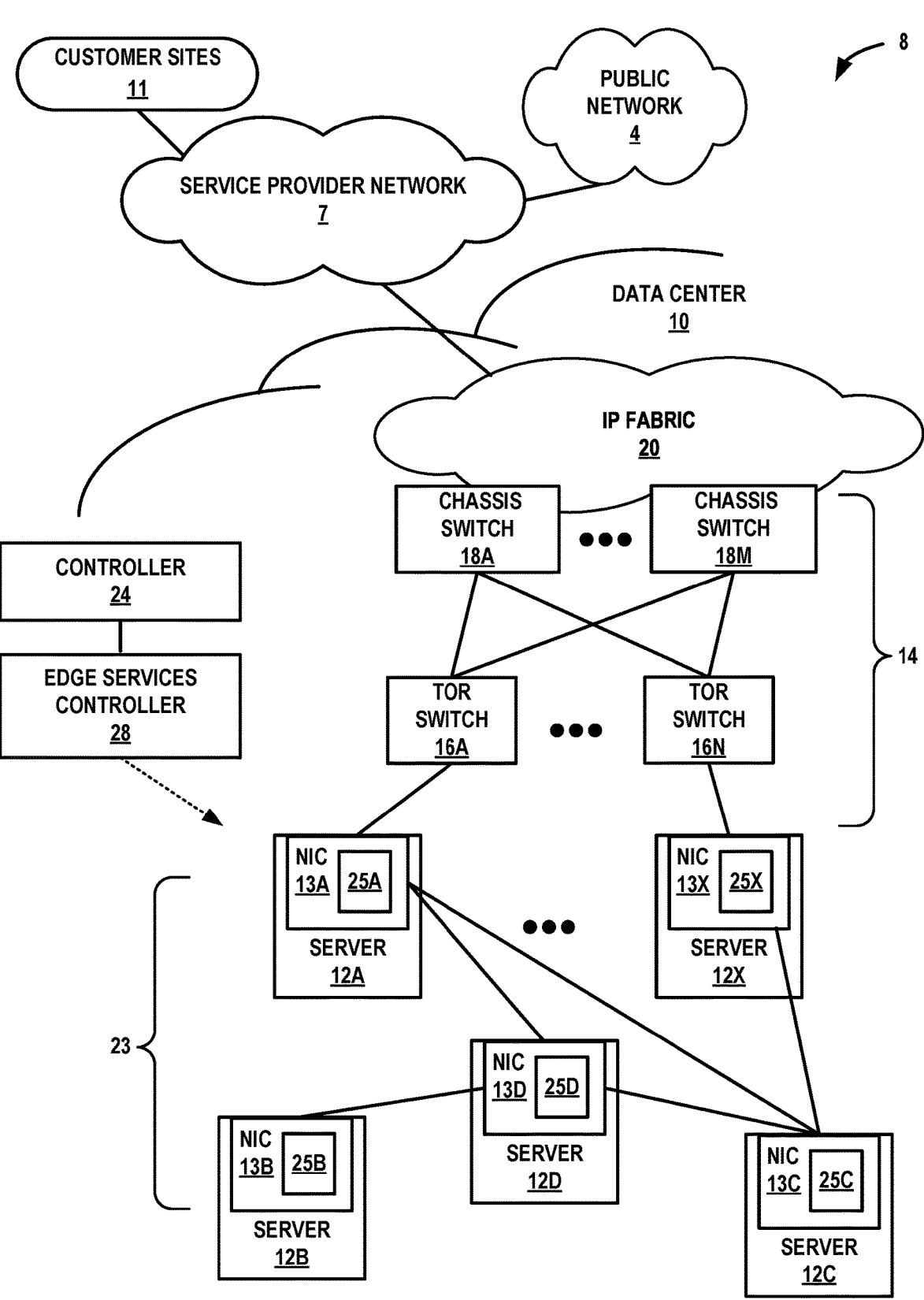
FIG. 1 is a block diagram illustrating an example network system having a data center in which examples of the techniques described herein may be implemented.

FIG. 1 is a block diagram illustrating an example network system 8 having a data center 10 in which examples of the techniques described herein may be implemented. In general, data center 10 provides an operating environment for applications and services for customer sites 11 having one or more customer networks coupled to data center 10 by a service provider network 7. Data center 10 may, for example, host infrastructure equipment, such as networking and storage systems, redundant power supplies, and environmental controls. Service provider network 7 is coupled to a public network 4. Public network 4 may represent one or more networks administered by other providers and may thus form part of a large-scale public network infrastructure, e.g., the Internet. For instance, public network 4 may represent a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 4 are illustrated and described primarily as edge networks of service provider network 7, in some examples, one or more of customer sites 11 and public network 4 are tenant networks within data center 10 or another data center. For example, data center 10 may host multiple tenants (customers) each associated with one or more virtual private networks (VPNs). Each of the VPNs may implement one of customer sites 11.

Service provider network 7 offers packet-based connectivity to attached customer sites 11, data center 10, and public network 4. Service provider network 7 may represent a network that is operated (and potentially owned) by a service provider to interconnect a plurality of networks. Service provider network 7 may implement Multi-Protocol Label Switching (MPLS) forwarding and, in such instances, may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack (TOR) switches 16A-16N. This disclosure may refer to TOR switches 16A-16N collectively, as "TOR switches 16." TOR switches 16 may be network devices that provide layer 2 (MAC) and/or layer 3 (e.g., IP) routing and/or switching functionality.

Servers 12 may also be referred to herein as "hosts" or "host devices." Data center 10 may include many additional servers coupled to other TOR switches 16 of the data center 10. In the example of FIG. 1, servers 12A and 12X are directly coupled to TOR switches 16, and servers 13B, 13C, and 13D are not directly coupled to TOR switches 16 in the illustrated example. Servers 13B, 13C, and 13D may reach TOR switches 16 and IP fabric 20 via servers 12A or 12X, as described in further detail below.

Switch fabric 14 in the illustrated example includes interconnected TOR switches 16 (or other "leaf" switches) coupled to a distribution layer of chassis switches 18A-18M (collectively, "chassis switches 18"). Chassis switches may also be referred to as "spine" or "core" switches. Although not shown in the example of FIG. 1, data center 10 may also include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, and/or other network devices.

In some examples, TOR switches 16 and chassis switches 18 provide servers 12 with redundant (e.g., multi-homed) connectivity to IP fabric 20 and service provider network 7. Chassis switches 18 aggregate traffic flows and provide connectivity between TOR switches 16. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 via service provider network 7. The switching architecture of data center 10 shown in FIG. 1 is merely an example. Other switching architectures may have more or fewer switching layers, for instance. TOR switches 16 and chassis switches 18 may each include physical network interfaces.

In this disclosure, the terms "packet flow," "traffic flow," or simply "flow" each refer to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. The term "source port" refers to a transport layer (e.g., TCP/UDP) port. A "port" may refer to a physical network interface of a NIC.

Each of servers 12 may be a compute node, an application server, a storage server, or other type of server. For example, each of servers 12 may represent a computing device, such as an x86 processor-based server, configured to operate according to techniques described herein. Servers 12 may provide Network Function Virtualization Infrastructure (NFVI) for a Network Function Virtualization (NFV) architecture.

Servers 12 may host endpoints for one or more virtual networks that operate over the physical network represented in FIG. 1 by IP fabric 20 and switch fabric 14. Endpoints may include, e.g., virtual machines, containerized applications, or applications executing natively on the operating system or bare metal. Although described primarily with respect to a data center-based switching network, other physical networks, such as service provider network 7, may underlay the one or more virtual networks.

Each of servers 12 includes at least one network interface card (NIC) of NICs 13A-13X (collectively, "NICs 13"). For example, server 12A includes NIC 13A. Each of NICs 13 includes at least one port. Each of NICs 13 may send and receive packets over one or more communication links coupled to the ports of the NIC.

In some examples, each of NICs 13 provides one or more virtual hardware components for virtualized input/output (I/O). A virtual hardware component for virtualized I/O may be a virtualization of a physical NIC 13 (the "physical function"). For example, in Single Root I/O Virtualization (SR-IOV), which is described in the Peripheral Component Interface Special Interest Group SR-IOV specification, the Peripheral Component Interface (PCI) express (PCIe) Physical Function of the network interface card (or "network adapter") is virtualized to present one or more virtual network interface cards as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions and may provide SR-IOV with Data Plane Development Kit (DPDK)-based direct process user space access.

In some examples, including the example of FIG. 1, one or more of NICs 13 include multiple ports. NICs 13 may be connected to one another via ports of NICs 13 and communications links to form a NIC fabric 23 having a NIC fabric topology. NIC fabric 23 is the collection of NICs 13 connected to at least one other of NICs 13 and the communications links coupling NICs 13 to one another.

NICs 13A-13X include corresponding processing units 25A-25X (collectively, "processing units 25"). Processing units 25 to offload aspects of the datapath from CPUs of servers 12. One or more of processing units 25 may be a multi-core ARM processor with hardware acceleration provided by a Data Processing Unit (DPU), a Field Programmable Gate Array (FPGA), and/or an Application Specific Integrated Circuit (ASIC). Because NICs 13 include processing units 25, NICs 13 may be referred to as "Smart-NICs" or "GeniusNICs."

In accordance with various aspects of the techniques of this disclosure, an edge services platform uses processing units 25 of NICs 13 to augment the processing and networking functionality of switch fabric 14 and/or servers 12 that include NICs 13. In the example of FIG. 1, network system 8 includes an edge services controller 28. This disclosure may also refer to an edge services controller, such as edge services controller 28, as an edge services platform controller.

Edge services control 28 may manage the operations of the edge services platform within NIC 13s in part by orchestrating services performed by processing units 25; orchestrating API driven deployment of services on NICs 13; orchestrating NIC 13 addition, deletion and replacement within the edge services platform; monitoring of services and other resources on NICs 13; and/or management of connectivity between various services 133 running on the NICs 13. Edge services controller 28 may include one or more computing devices, such as server devices, personal computers, intermediate network devices, or the like.

Edge services controller 28 may communicate information describing services available on NICs 13, a topology of NIC fabric 23, or other information about the edge services platform to an orchestration system (not shown) or a controller 24. Example orchestration systems include Open-Stack, vCenter by VMWARE, or System Center by Microsoft Corporation of Redmond, Washington. Example controllers include a controller for Contrail by JUNIPER NETWORKS or Tungsten Fabric. Controller 24 may be a network fabric manager. Additional information regarding a controller 24 operating in conjunction with other devices of data center 10 or other software-defined network is found in International Application Number PCT/JS2013/044378, filed Jun. 5, 2013, and entitled "PHYSICAL PATH DETERMINATION FOR VIRTUAL NETWORK PACKET FLOWS;" and in U.S. Pat. No. 9,571,394, filed Mar. 26, 2014, and entitled "Tunneled Packet Aggregation for Virtual Networks," each of which is incorporated by reference as if fully set forth herein.

In some examples, edge services controller 28 programs processing units 25 of NICs 13 to route data packets along data paths through NIC fabric 23, e.g., based on applications (services) associated with the data packets. Routing data packets along data paths through NIC fabric 23 may avoid overloading individual NICs in NIC fabric 23 when multiple services on a pair of hosts are communicating with each other. In accordance with an example of this disclosure, edge services control 28 may manage data packet routing in NIC fabric 23. As shown in FIG. 1, NIC fabric 23 comprises a plurality of NICs 13 coupled by communication links in a NIC fabric topology. In this example, edge services controller 28 may receive resource availability values from NICs 13. Edge services controller 28 may determine a data path for data packets of a flow transported using a protocol from a source NIC to a destination NIC via a NIC set that comprises at least one NIC. NICs 13 include the source NIC, the destination NIC, and the NIC set. As part of determining the data path, edge services controller 28 may select the NIC set based on the resource availability values. Edge services controller 28 may transmit, to the source NIC and to each NIC in the NIC set, data path data to cause the source NIC and each NIC in the NIC set to identify the data packets of the flow using an identifier of the protocol and to transmit the data packets of the flow from the source NIC to the destination NIC via the data path. Edge services controller 28 may establish multiple data paths in this manner. Unlike in a conventional data center fabric, servers 12 may thus exchange packets to directly, rather than via a separate switching device (such as chassis switches 18). The above may be considered a form of service load balancing.

In a related example, one or more of NICs 13 may transmit a resource availability value of the NIC to edge services controller 28. The NIC may receive, from edge services controller 28, data path data associated with a data path for data packets of a flow transported using a protocol from a source NIC in NIC fabric 23 to a destination NIC in NIC fabric 23. The data path may be computed using the resource availability value of the NIC. The data path data may comprise a flow identifier of the flow mapped to a next-hop port identifier of the NIC port. The NIC may receive a data packet of the flow and map, based on the data path data, the data packet to the flow identifier of the flow. The NIC may then output, based on the data path data and the flow identifier of the flow, the data packet via the NIC port.

In some examples, edge services controller 28 computes, based on a physical topology of physical links that connect NICs 13, a virtual topology comprising a strict subset of the physical links. Edge services controller 28 may program the virtual topology into the respective processing units of the NICs to cause the processing units of the NICs to send data packets via physical links in the strict subset of the physical links. In this way, edge services controller 28 may dynamically generate a virtual topology that provides data paths between NICs, without necessarily traversing a TOR switch. This may reduce latency between services (applications) that communicate within a rack.

In some examples, edge services controller 28 programs a processing unit of a NIC of a plurality of network interface cards 13 to receive, at a first network interface of the NIC, a data packet from a physical device. Edge services controller 28 may also program the processing unit of the NIC to modify, based on the data packet being received at the first network interface, the data packet to generate a modified data packet. Edge services controller 28 may also program the processing unit of the NIC to output the modified data packet to the physical device via a second network interface of the NIC. Programming the processing unit of the NIC in this way may enable offloading of the packet modification process from a TOR switch (e.g., one or more of TOR switches 16) or host computer to the NIC. Offloading modifications of data packets to NICs may relieve computations burdens on the TOR switch or host computer, or may extend the functionality of the TOR switch or host computer.

Figure 2:
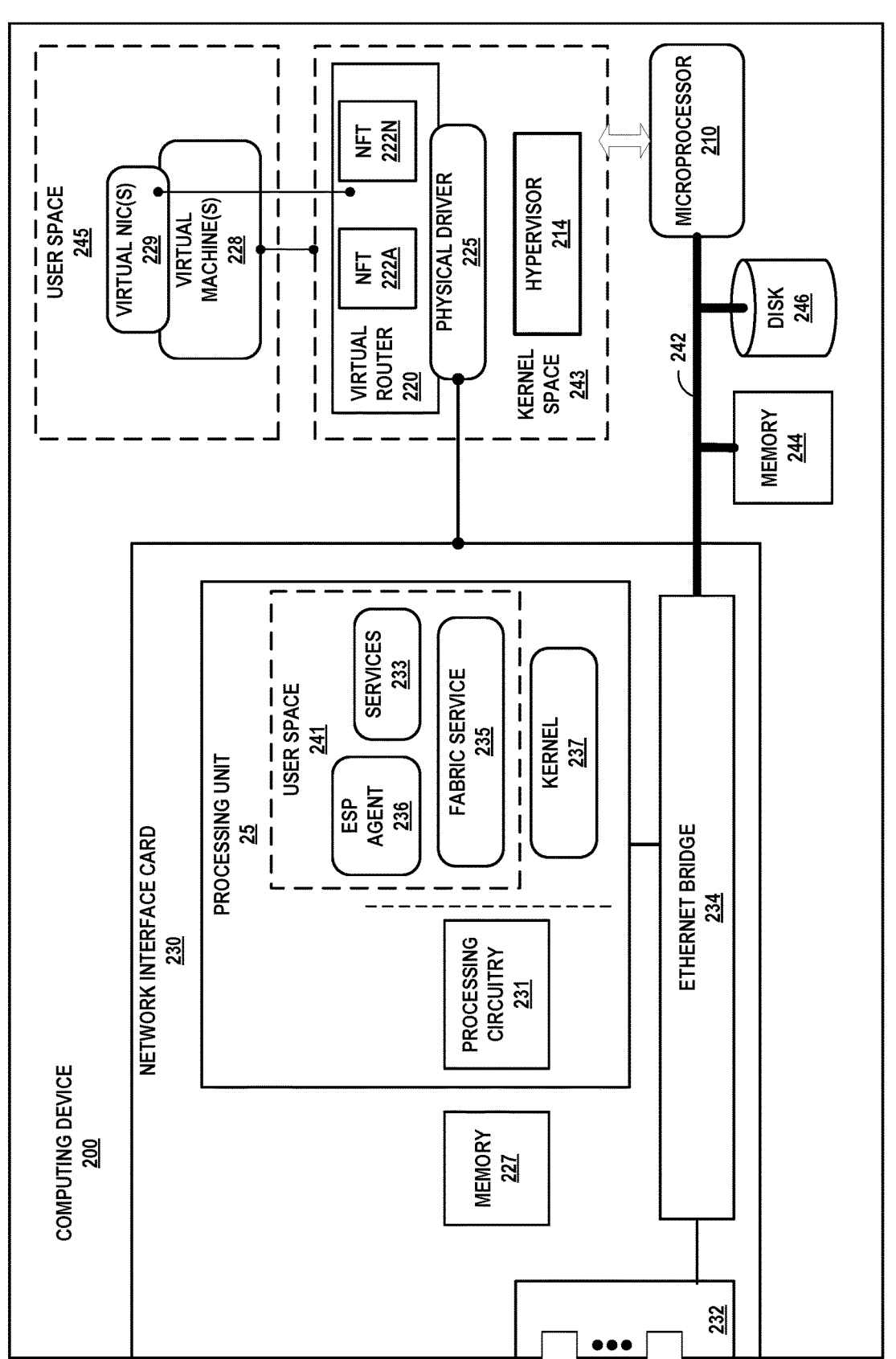
FIG. 2 is a block diagram illustrating an example computing device that uses a network interface card having a separate processing unit, to perform services managed by an edge services platform according to techniques described herein.

FIG. 2 is a block diagram illustrating an example computing device 200 that uses a NIC 230 having a separate processing unit 25, to perform services managed by an edge services platform according to techniques described herein. Computing device 200 of FIG. 2 may represent a real or virtual server and may represent an example instance of any of servers 12 of FIG. 1. In the example of FIG. 2, computing device 200 includes a bus 242 that couples hardware components of the hardware environment of computing device 200. Specifically, in the example of FIG. 2, bus 242 couples a Single Route Input/Output Virtualization (SR-IOV)-capable NIC 230, a storage disk 246, and a microprocessor 210. In some examples, a front-side bus couples micropro-cessor 210 and memory device 244. In some examples, bus 242 couples memory device 244, microprocessor 210, and NIC 230. Bus 242 may represent a PCIe bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit ("processing core") to perform instructions that conform to an instruction set architecture. Execution units may be implemented as separate integrated circuits (ICs) or may be combined within one or more multi-core processors (or "many-core" proces-sors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versa-tile discs (DVD) or other optical storage, magnetic cassettes, magnetic tape, magnetic disk storage or other magnetic storage devices, or any other medium that can be used to store the desired information and that can be accessed by microprocessor 210.

Memory device 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory device 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 also include an on-card memory 227 to, e.g., store packet data. Direct memory access transfers between NIC 230 and other devices coupled to bus 242 may read/write from/to the memory 227.

Memory device 244, NIC 230, disk 246, and micropro-cessor 210 provide an operating environment for a software stack that executes a hypervisor 214 and one or more virtual machines 228 managed by hypervisor 214. In general, a virtual machine provides a virtualized/guest operating sys-tem for executing applications in an isolated virtual envi-ronment. Because a virtual machine is virtualized from physical hardware of the host server, executing applications are isolated from both the hardware of the host and other virtual machines. Computing device 200 executes hypervi-sor 214 to manage virtual machines 228. Example hypervi-sors include Kernel-based Virtual Machine (KVM) for the Linux kernel, Xen, ESXi available from VMWARE, Win-dows Hyper-V available from MICROSOFT, and other open-source and proprietary hypervisors. Hypervisor 214 may represent a virtual machine manager (VMM). Virtual machines 228 may host one or more applications, such as virtual network function instances. In some examples, a virtual machine 228 may host one or more VNF instances, where each of the VNF instances is configured to apply a network function to packets.

An alternative to virtual machines is the virtualized con-tainer, such as those provided by the open-source DOCKER Container application. Like a virtual machine, each con-tainer is virtualized and may remain isolated from the host machine and other containers. However, unlike a virtual machine, each container may omit an individual operating system and provide only an application suite and applica-tion-specific libraries. A container is executed by the host machine as an isolated user-space instance and may share an operating system and common libraries with other contain-ers executing on the host machine. Thus, containers may require less processing power, storage, and network resources than virtual machines. As used herein, containers may also be referred to as virtualization engines, virtual private servers, silos, or jails. In some instances, the tech-niques described herein with respect to containers and virtual machines or other virtualization components.

While virtual network endpoints in FIG. 2 are illustrated and described with respect to virtual machines, other oper-ating environments, such as containers (e.g., a DOCKER container) may implement virtual network endpoints. An operating system kernel (not shown in FIG. 2) may execute in kernel space and may include, for example, a Linux, Berkeley Software Distribution (BSD), another Unix-vari-ant kernel, or a Windows server operating system kernel, available from MICROSOFT.

Hypervisor 214 includes a physical driver 225 to use a physical function provided by NIC 230. In some cases, NIC 230 may also implement SR-IOV to enable sharing the physical network function (I/O) among virtual machines 224. Each port of NIC 230 may be associated with a different physical function. The shared virtual devices, also known as virtual functions, provide dedicated resources such that each of virtual machines 228 (and corresponding guest operating systems) may access dedicated resources of NIC 230, which therefore appears to each of virtual machines 224 as a dedicated NIC. Virtual functions may be lightweight PCIe functions that share physical resources with the physical function and with other virtual functions. NIC 230 may have thousands of available virtual functions according to the SR-IOV standard, but for I/O-intensive applications the number of configured virtual functions is typically much smaller.

Virtual machines 228 include respective virtual NICs 229 presented directly into the virtual machine 228 guest oper-ating system, thereby offering direct communication between NIC 230 and virtual machines 228 via bus 242, using the virtual function assigned for the virtual machine. This may reduce hypervisor 214 overhead involved with software-based, VIRTIO and/or vSwitch implementations in which a memory address space of hypervisor 214 within memory device 244 stores packet data and because copying packet data from NIC 230 to the memory address space of hypervisor 214 and from the memory address space of hypervisor 214 to memory address spaces of virtual machines 228 consumes cycles of microprocessor 210.

NIC 230 may further include a hardware-based Ethernet bridge 234. Ethernet bridge 234 may be an example of an embedded switch 234. Ethernet bridge 234 may perform layer 2 forwarding between virtual functions and physical functions of NIC 230. Thus, in some cases, Ethernet bridge 234 provides hardware acceleration, via bus 242, of inter-virtual machine 224 packet forwarding and hardware accel-eration of packet forwarding between hypervisor 214 and any of virtual machines 224. Hypervisor 214 may access the physical function via physical driver 225. Ethernet bridge 234 may be physically separate from processing unit 25.

Computing device 200 may be coupled to a physical network switch fabric that includes an overlay network that extends a switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. At least some functions of the virtual router may be performed as one of services 233 or fabric service 235. In the example of FIG. 2, virtual router 220 executes within hypervisor 214 that uses physical function 221 for I/O, but virtual router 220 may execute within a hypervisor, a host operating system, a host application, one of virtual machines 228, and/or processing unit 25 of NIC 230.

In general, each virtual machine 228 may be assigned a virtual address for use within a corresponding virtual network, where each of the virtual networks may be associated with a different virtual subnet provided by virtual router 220. A virtual machine 228 may be assigned its own virtual layer three (L3) IP address, for example, for sending and receiving communications but may be unaware of an IP address of the computing device 200 on which the virtual machine is executing. In this way, a "virtual address" is an address for an application that differs from the logical address for the underlying, physical computer system, e.g., computing device 200.

In one implementation, computing device 200 includes a virtual network (VN) agent (not shown) that controls the overlay of virtual networks for computing device 200 and that coordinates the routing of data packets within computing device 200. In general, a VN agent communicates with a virtual network controller for the multiple virtual networks, which generates commands to control routing of packets. A VN agent may operate as a proxy for control plane messages between virtual machines 228 and virtual network controller, such as controller 24 (FIG. 1). For example, a virtual machine may request to send a message using its virtual address via the VN agent, and VN agent may in turn send the message and request that a response to the message be received for the virtual address of the virtual machine that originated the first message. In some cases, a virtual machine 228 may invoke a procedure or function call presented by an application programming interface of VN agent, and the VN agent may handle encapsulation of the message as well, including addressing.

In one example, network packets, e.g., layer three (L3) IP packets or layer two (L2) Ethernet packets generated or consumed by the instances of applications executed by virtual machine 228 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), Virtual Extensible Local Area Network (VXLAN), Multiprotocol Label Switching (MPLS) over GRE (MPLSoGRE), MPLS over User Datagram Protocol (UDP) (MPLSoUDP), etc.

As noted above, a virtual network controller may provide a logically centralized controller for facilitating operation of one or more virtual networks. The virtual network controller may, for example, maintain a routing information base, e.g., one or more routing tables that store routing information for the physical network as well as one or more overlay networks. Virtual router 220 of hypervisor 214 implements a network forwarding table (NFT) 222A-222N for N virtual networks for which virtual router 220 operates as a tunnel endpoint. In general, each NFT 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of NFTs 222 may be an NFT for a different routing instance (not shown) implemented by virtual router 220.

In accordance with techniques of this disclosure, edge services controller 28 (FIG. 1) uses processing unit 25 of NIC 230 to augment the processing and networking functionality of computing device 200. Processing unit 25 includes processing circuitry 231 to execute services orchestrated by edge services controller 28. Processing circuitry 231 may represent any combination of processing cores, ASICs, FPGAs, or other integrated circuits and programmable hardware. In an example, processing circuitry may include a System-on-Chip (SoC) having, e.g., one or more cores, a network interface for high-speed packet processing, one or more acceleration engines for specialized functions (e.g., security/cryptography, machine learning, storage), programmable logic, integrated circuits, and so forth. Such SoCs may be referred to as data processing units (DPUs). DPUs may be examples of processing unit 25.

In the example NIC 230, processing unit 25 executes an operating system kernel 237 and a user space 241 for services. Kernel 237 may be a Linux kernel, a Unix or BSD kernel, a real-time OS kernel, or other kernel for managing hardware resources of processing unit 25 and managing user space 241.

Services 233 may include network, security, storage, data processing, co-processing, machine learning or other services. Services 233, edge services platform (ESP) agent 236, and fabric service 235 include executable instructions. Processing unit 25 may execute instructions of services 233, ESP agent 236, and fabric service 235 as processes and/or within virtual execution elements such as containers or virtual machines. As described elsewhere in this disclosure, services 233 may augment the processing power of the host processors (e.g., microprocessor 210), e.g., by enabling computing device 200 to offload packet processing, security, or other operations that would otherwise be executed by the host processors. Network services of services 233 may include security services (e.g., firewall), policy enforcement, proxy, load balancing, or other L4-L7 services.

Processing unit 25 executes ESP agent 236 to exchange data with edge services controller 28 (FIG. 1) for the edge services platform. While shown in the example of FIG. 2 as being in user space 241, in other examples, ESP agent 236 is a kernel module of kernel 237. As an example, ESP agent 236 may collect and send telemetry data to the ESP controller. The telemetry data may be generated by services 233 and may describe traffic in the network, availability of computing device 200 or network resources, resource availability of resources of processing unit 25 (such as memory or core utilization), or other information. As another example, ESP agent 236 may receive, from the ESP controller, service code to execute any of services 233, service configuration to configure any of services 233, packets or other data for injection into the network.

Edge services controller 28 manages the operations of processing unit 25 by, e.g., orchestrating and configuring services 233 that are executed by processing unit 25, deploying services 233; adding, deleting and replacing NICs within the edge services platform, monitoring of services 233 and other resources on NIC 230, and managing connectivity between various services 233 running on NIC 230. Example resources on NIC 230 include memory 227 and processing circuitry 231.

Processing circuitry 231 executes fabric service 235 to perform packet switching among NIC 230 and one or more other NICs that are directly connected to NIC 230 ports, i.e., not via an external switch such as TOR switches 16. Edge services controller 28 may provide topology information to fabric service 235 via ESP agent 236, the topology information describing a topology of NIC fabric 23. Edge services controller 28 may provide flow information and/or forwarding information to fabric service 235 via ESP agent 236. The flow information describes, and is usable for identifying, packet flows. The forwarding information is usable for mapping packets received by NIC 230 to an output port of NIC 230. In some cases, fabric service 235 may independently compute forwarding information and/or flow information.

Fabric service 235 may determine processing and forwarding of packets received at NIC 230 and bridged by Ethernet bridge 234 to processing unit 25. A packet received by NIC 230 may have been sent to NIC 230 from a NIC of another computing device or may have originated from user space 245 of computing device 200. Like other services 233 of NIC 230, fabric service 235 may process a received packet. Based on information received from edge services controller 28 or generated by fabric service 235, such as forwarding information and/or flow information, fabric service 235 may map the received packet to an output port that is directly coupled, via a communicate link, to another NIC in the NIC fabric.

In some examples, ESP agent 236 may cause NIC 230 to transmit a resource availability value of NIC 230 to edge services controller 28. NIC 230 may receive, from edge services controller 28, data path data associated with a data path for data packets of a flow transported using a protocol from a source NIC in NIC fabric 23 to a destination NIC in NIC fabric 23. The data path may be computed, in part, using the resource availability value of NIC 230. The data path data may comprise a flow identifier of the flow mapped to a next-hop port identifier of a NIC port (e.g., one of interfaces 232). NIC 230 may receive a data packet of the flow and fabric service 235 may map, based on the data path data, the data packet to the flow identifier of the flow. NIC 230 may then output, based on the data path data and the flow identifier of the flow, the data packet via the NIC port.

In some examples, edge services controller 28 computes, based on a physical topology of physical links that connect NICs, such as NIC 230, a virtual topology comprising a strict subset of the physical links. Edge services controller 28 may program the virtual topology into the respective processing units of the NICs (e.g., processing unit 25 of NIC 230) to cause the processing units of the NICs to send data packets via physical links in the strict subset of the physical links. In this way, edge services controller 28 may dynamically generate a virtual topology that provides data paths between NICs, without necessarily traversing a TOR switch. This may reduce latency between services (applications) that communicate within a rack.

In some examples, edge services controller 28 programs processing unit 25 of NIC 230 of a plurality of network interface cards 13 to receive, at a first network interface of NIC 230, a data packet from a physical device. Edge services controller 28 may also program processing unit 25 of NIC 230 to modify, based on the data packet being received at the first network interface, the data packet to generate a modified data packet. Edge services controller 28 may also program processing unit 25 of NIC 230 to output the modified data packet to the physical device via a second network interface of the NIC. Programming processing unit 25 of NIC 230 in this way may enable offloading of the packet modification process from a TOR switch (e.g., one or more of TOR switches 16) or host computer to the NIC. Offloading modifications of data packets to NICs may relieve computations burdens on the TOR switch or host computer, or may extend the functionality of the TOR switch or host computer.

Figure 3:
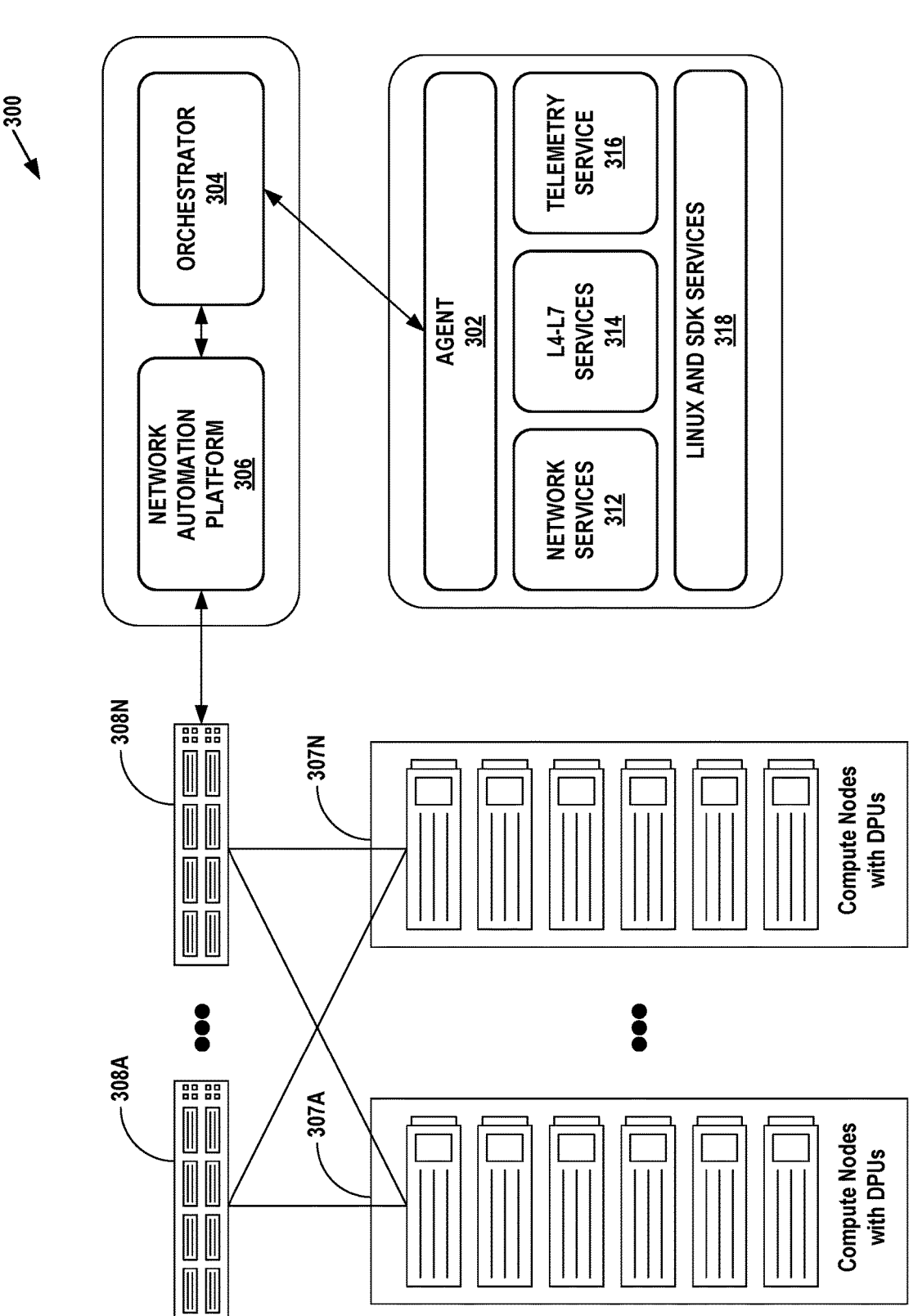
FIG. 3 is a conceptual diagram illustrating a data center with servers that each include a network interface card having a separate processing unit, controlled by an edge services platform, according to techniques of this disclosure.

FIG. 3 is a conceptual diagram illustrating a data center 300 with servers that each include a network interface card having a separate processing unit, controlled by an edge services platform, according to techniques of this disclosure. Racks of compute nodes 307A-307N (collectively, "racks of compute nodes 307") may correspond to servers 12 of FIG. 1, and switches 308A-308N (collectively, "switches 308") may correspond to the switches of switch fabric 14 of FIG. 1. An agent 302 or orchestrator 304 represents software executed by the processing unit (illustrated in FIG. 3 as a data processing unit or DPU) and receives configuration information for the processing unit and sends telemetry and other information for the NIC that includes the processing unit to orchestrator 304. Network services 312, L4-L7 services 314, telemetry service 316, and Linux and software development kit (SDK) services 318 may represent examples of services 233. Orchestrator 304 may represent an example of edge services controller 28 of FIG. 1.

Network automation platform 306 connects to and manages network devices and orchestrator 304, by which network automation platform 306 can utilize the edge services platform. Network automation platform 306 may, for example, deploy network device configurations, manage the network, extract telemetry, and analyze and provide indications of the network status.

Figure 4:
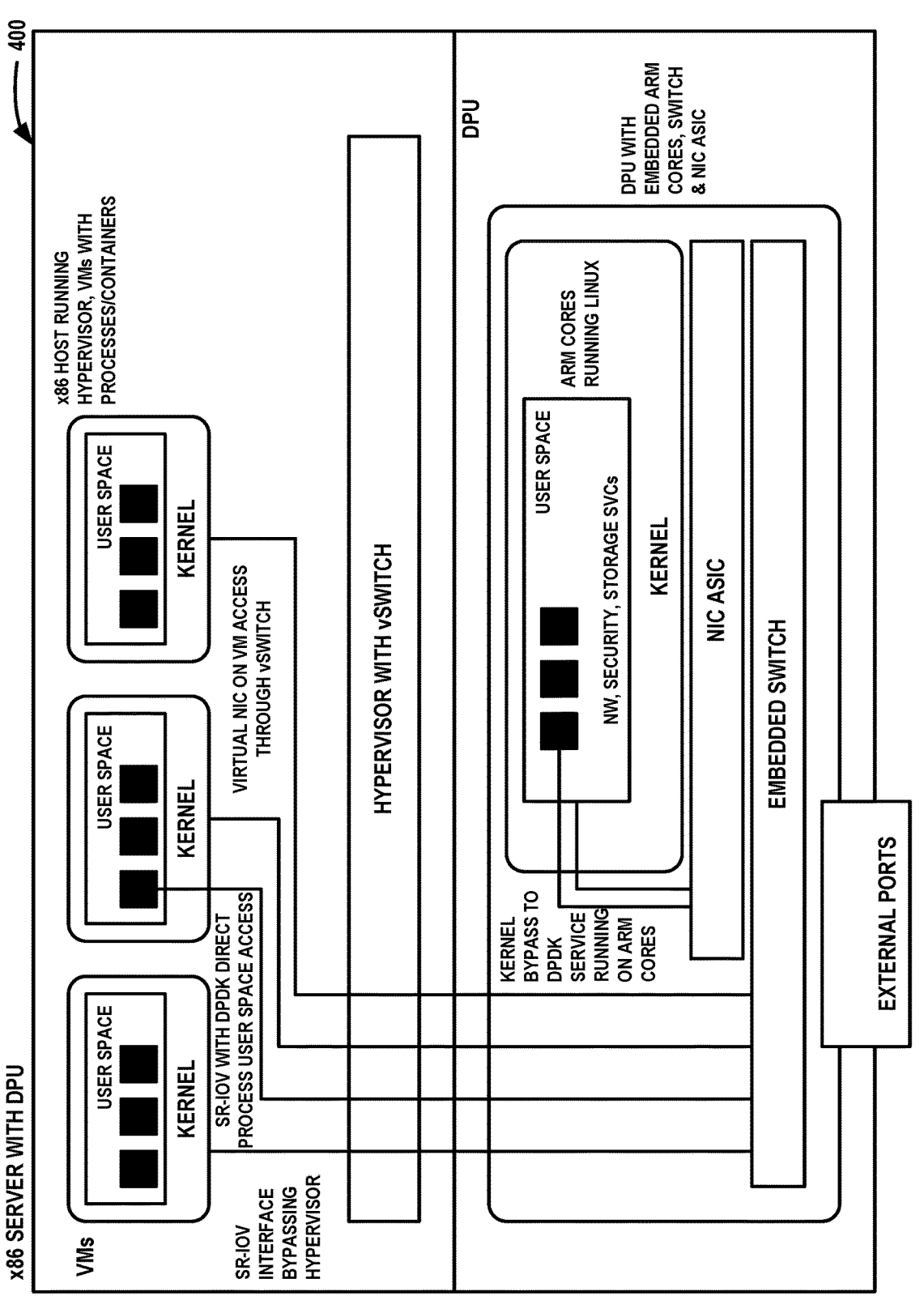
FIG. 4 is a block diagram illustrating an example computing device that uses a network interface card having a separate processing unit, to perform services managed by an edge services platform according to techniques described herein.

FIG. 4 is a block diagram illustrating an example computing device that uses a network interface card having a separate processing unit, to perform services managed by an edge services platform according to techniques described herein. Although virtual machines are shown in this example, other instances of computing device 400 may also or alternatively run containers, native processes, or other endpoints for packet flows. Different types of vSwitches may be used, such as Open vSwitch or a virtual router (e.g., Contrail). Other types of interfaces between endpoints and NIC are also contemplated, such as tap interfaces, veth pair interfaces, etc.

Figure 5:
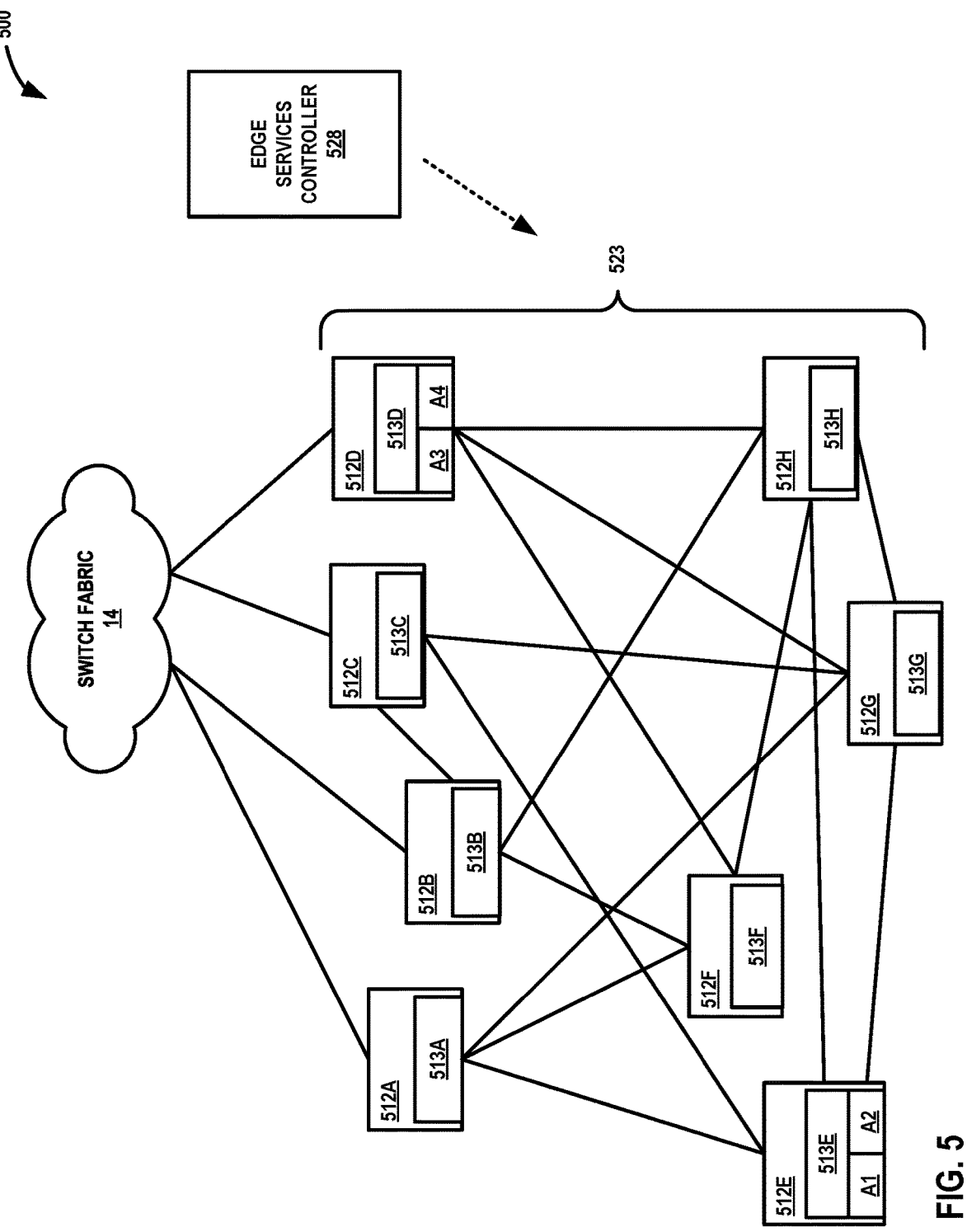
FIG. 5 a block diagram illustrating an example system, according to techniques of this disclosure.

FIG. 5 is a block diagram illustrating an example system 500, according to techniques of this disclosure. System 500 includes a plurality of servers 512A-512H (collectively, "servers 512") communicatively coupled via a NIC fabric 523 and a switch fabric 514. System 500 includes an edge services controller 528. Each of the plurality of servers 512A-512H may include a corresponding one of NICs 513A-513H (collectively, "NICs 513"). The NIC fabric 523 includes NICs 513. The NIC fabric 523 may include a plurality of potential data paths between pairs of NICs 513 that do not traverse switches of switch fabric 514. Each of these "data paths" is a path through NIC fabric 523 from a source NIC to a destination NIC, and this term is distinct from datapath processing. Edge services controller 528 may be communicatively coupled to each of NICs 513 in NIC fabric 523. NIC fabric 523 is communicatively coupled to switch fabric 514. Switch fabric 514 may include one or more switches.

Each of servers 512 may have a configuration similar to the configuration of computing device 200. Each of NICs 513 may have a configuration similar to the configuration of NIC 230. Edge services controller 528 may be similar to edge services controller 28. While eight servers 512 and eight NICs 513 are shown in the example system 500 of FIG. 5, alternative examples of systems may include a fewer or a greater number of servers 512 and NICs 513. While each server is shown as including a single NIC, alternative examples of the system may include servers with more than one NIC.

Servers 512 may execute one or more applications. In an example, the one or more applications may be server applications hosted by servers 512 and may represent endpoints, as described with respect to FIG. 1. In an example, the one or more applications may be NIC applications executed by processing units of NICs 513. The implementation of data paths between two different NICs at two different servers may involve two stages. The first stage may be an orchestration stage and the second stage may be a forwarding stage. Edge services controller 528 may define or orchestrate one or more data paths between the two different NICs at two different servers during the orchestration stage. Edge services controller 528 may provide data path data associated with the orchestrated data paths to NICs in the data paths. NICs in the orchestrated data paths may forward data packets in accordance with the orchestrated data paths during the forwarding stage. Data path data may be an example of forwarding information described with respect to FIG. 1.

The implementation of the orchestration stage and the forwarding stage will be described with reference to applications A1, A2 running on server 512E and applications A3, A4 running on server 512D. Applications A1, A2, A3, and A4 may be server applications (i.e., applications executed by the host processors) or may be NIC applications (i.e., applications executed by a processing unit on the NIC). In this example, application A1 and application A3 may be services of a service chain, and application A2 and application A4 may be services of a service chain.

Application A1 may be configured to generate application data for transport in data packets, and server 512E may be configured to send the data packets in accordance with a first protocol for transmission to application A3. Application A1 may be referred to as a first source application A1 and the application A3 may be referred to as a first destination application. Application A2 may be configured to generate application data for transport in data packets, and server 512E may be configured to send the data packets in accordance with a second protocol for transmission to application A4. Application A2 may be referred to as a second source application A2 and application A4 may be referred to as a second destination application. The second protocol may be different from the first protocol.

Examples of the first and second protocols include, but are not limited to, transport layer protocols or tunneling protocols (which may leverage transport layer protocols). The first protocol may for example be a VXLAN protocol. The second protocol may be for example, a Multiprotocol Label Switching/User Datagram Protocol (MPLSoUDP) protocol. While the example is described with reference to VXLAN and MPLSoUDP protocols, other protocols may be used. Server 512E, which includes source applications A1 and A2, may be referred to as a source server 512E. NIC 513E at source server 512E may be referred to as a source NIC 513E. Server 512D includes destination applications A3 and A4, and may be referred to as a destination server 512D. NIC 513D at destination server 512D may be referred to as a destination NIC 513D.

NICs 513 in NIC fabric 523 and edge services controller 528 may implement NIC-based data packet forwarding. In this environment, processing units 25 in NICs 513 may be shared by services running on associated servers 512 and NIC fabric 523. If all traffic between a set of two of servers 512 takes the same data path all the time, the traffic between the servers may overload NIC 513 and impact the services running on servers 512. For example, if traffic from application A1 to application A3 and traffic from application A2 to application A4 was forwarded on the same data path from source NIC 513E to destination NIC 513D, this may result in relatively high utilization of resources of any NICs 513 along that data path and adversely affect performance.

Edge services controller 528 may address this problem by implementing "service aware" or "application-based" routing of the data packets. Edge services controller 528 may orchestrate the application-based data path and one or more of NICs 51 forward data packets in accordance with the orchestrated application-based data path for a pair of applications executing on servers 512 or NICs 513.

When an application (or service) is deployed at one of servers 512 or at one of NICs 513, edge services controller 528 may be provided with data regarding the deployed application during the configuration of the deployed application. Examples of such data may include a protocol associated with the deployed application and the other applications that the deployed application may communicate with. Furthermore, when an application is deployed to a host (e.g., one of servers 512), edge services controller 528 may configure the application's preferred transport in NIC fabric 523. For example, if a first service (S1) and a third service (S3) use VXLAN to communicate with each other, and a second service (S2) and a fourth service (S4) use MPLSoUDP for communication, edge services controller 528 may configure NIC fabric 523 to ensure that each application's transport requirements are met. For example, edge services controller 528 may specify, e.g., in a flow table, outer header encapsulation for packets sent between services. The services may be running on top of a host OS or executed by processing units of NICs 513, or both. In some examples, edge services controller 528 may deploy the applications or devices to servers 512 using the techniques described elsewhere in this disclosure, e.g., based on local SLAs and external SLAs of NICs 513.

In an example where NIC 513E is a source NIC and NIC 513D is a destination NIC, NIC fabric 523 may include a number of different data paths between source NIC 513E and destination NIC 513D. Application of services 233 to packets may utilize compute and bandwidth resources at each of NICs in NIC fabric 523. In many cases, application of services 233 to packets may utilize a percentage of the total available computing resources at some of NICs 513 and the remaining percentage of computing resources may be available to implement data packet forwarding functions (e.g., fabric service 235). Each of NICs 513 in NIC fabric 523 may provide resource availability values that indicates available computing resources at that NIC 513 to edge services controller 528. Example types of resource availability values may include values indicating CPU utilization, network utilization, and so on. Edge services controller 528 may identify, based on the resource availability values, NICs 513 in NIC fabric 523 that are suitable to implement data packet forwarding functions. For example, edge services controller 528 may compare the resource availability values received from each of NICs 513 to a resource availability threshold value, or to compare resource availability of NICs 513 to one another, to identify NICs 513 in NIC fabric 523 that are suitable to implement data packet forwarding functions. Suitable NICs 513 may include NICs 513 that have sufficient computing resources in processing units 25 to apply a fabric service to an expected amount of traffic for the pair of application communicating, a threshold amount of computing resources, or other criteria. Edge services controller 528 may use the identified NICs to orchestrate data paths between NICs in NIC fabric 523. When edge services controller 528 orchestrates a data path between a pair of NICs in NIC fabric 523, edge services controller 528 may provide data path data to NICs logically located along that data path to cause the NICs to forward data packets in accordance with the orchestrated data path. In some examples, edge services controller 528 may use one or more the processes described elsewhere in this disclosure (e.g., with respect to FIG. 18 and FIG. 19) to determine a virtual topology having the data paths.

Figure 6:
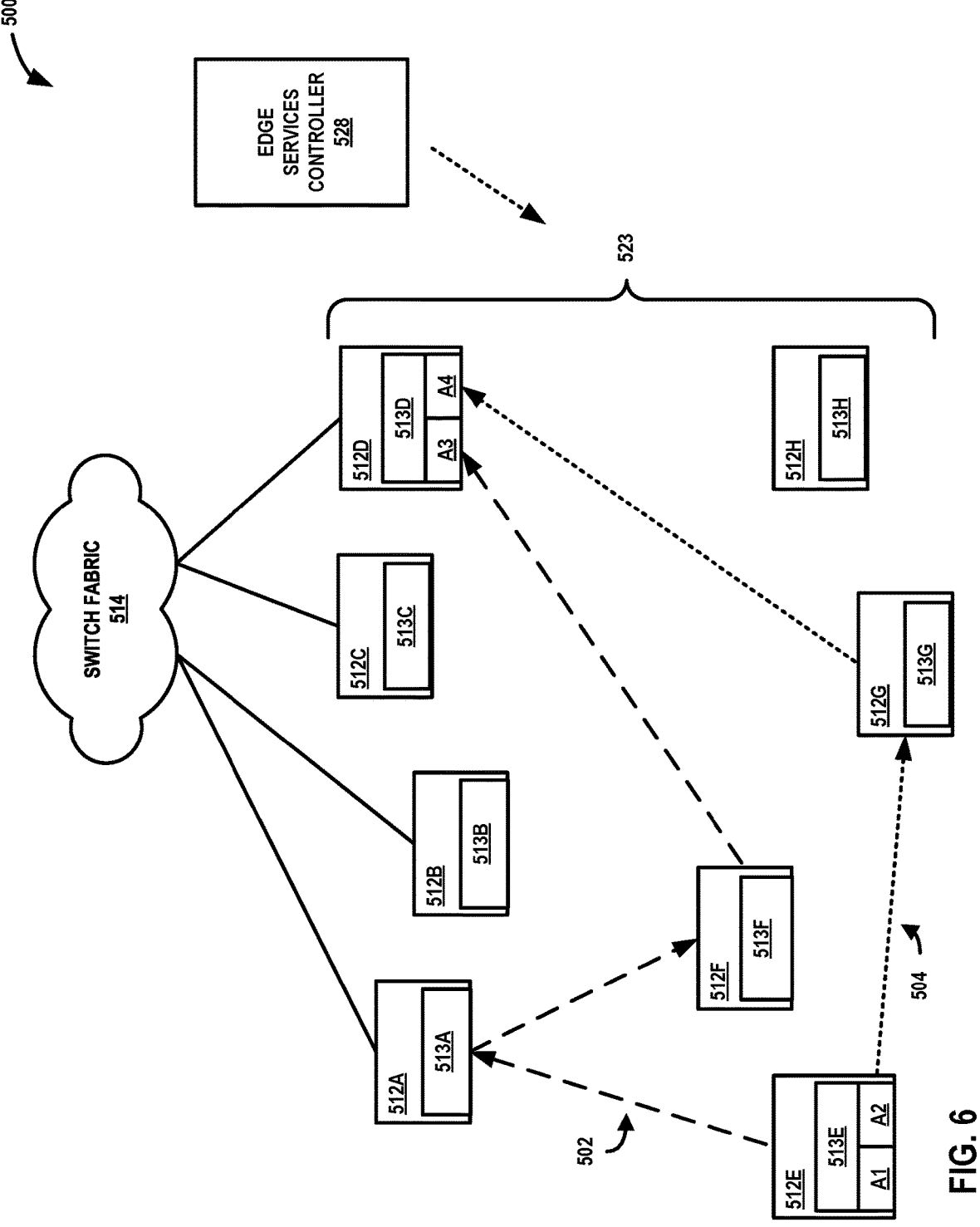
FIG. 6 is a block diagram illustrating the example system of FIG. 5 with two different application-based (service aware) data paths orchestrated by the edge services controller between the source at the source server and the destination NIC at the destination server, according to techniques of this disclosure.

FIG. 6 is a block diagram illustrating example system 500 of FIG. 5 with two different application-based (service aware) data paths 502, 504 orchestrated by edge services controller 528 between source NIC 513E at source server 512E and destination NIC 513D at destination server 512D. Utilizing the same data path to route data packets from both the first and second source applications A1, A2 at source server 512E to destination applications A3 and A4 at destination server 512D may overload the NICs in that single data path and impact the services running on those NICs and may also affect the network bandwidth available to corresponding servers 512. The use of data path 502 to route data packets from first source application A1 to destination application A3 via a NIC set that includes NICs 513A, 513F and a data path 504 to route data packets from source application A2 to destination application A4 via a NIC set that includes NIC 513G load balances packet flows between different pairs of applications within NIC fabric 523 and may therefore mitigate high compute and networking utilization on some of NICs 513 by such packet flows.

In some examples, edge services controller 528 may orchestrate data path 502 and data path 504 during the orchestration stage. Edge services controller 528 may receive resource availability values from each of NICs 513 in NIC fabric 523. Edge services controller 528 may select the NIC sets in data path 502 and data path 504 based on the resource availability values. For example, edge services controller 528 may compare the received resource availability values from each of NICs 513 with the resource availability threshold. Edge services controller 528 may identify those NICs 513A, 513F, 513G with resource availability values that are greater than the resource availability threshold as NICs 513A, 513F, 513G that have sufficient available computing resources available to apply fabric services for forwarding data packets. Edge services controller 528 may utilize the identified NICs 513A, 513F, 513G to orchestrate data path 502 and data path 504.

Data path 502 may be orchestrated by edge services controller 528 to transmit data packets having application data generated by first source application A1 and output from server 512E in accordance with a first protocol from source NIC 513E at source server 512E to first destination application A3 through destination NIC 513D at destination server 512D via the first NIC set 513A, 513F. Data path 504 may be orchestrated by edge services controller 528 to transmit data packets having application data generated by second source application A2 and output from server 512E in accordance with a second protocol from source NIC 513E at source server 512E to second destination application A4 through destination NIC 513D at destination server 512D via second NIC set 513G.

Edge services controller 528 may transmit first data path data to source NIC 513E, NIC 513A, and NIC 513F. In other words, edge services controller 528 may transmit data path data that is specific to NIC 513E, NIC 513A, and NIC 513F to NIC 513E, NIC 513A, and NIC 513F. The first data path data transmitted to source NIC 513E may cause source NIC 513E to transmit a flow of data packets having application data generated by first source application A1 to the next NIC in data path 502 (i.e., NIC 513A) using the appropriate NIC port that is coupled to NIC 513A. The first data path data transmitted to NIC 513A may cause NIC 513A to transmit the flow of data packets to the next NIC in data path 502 (i.e., NIC 513F) using the appropriate NIC port of NIC 513A that is coupled to NIC 513F. The first data path data transmitted to NIC 513F may cause NIC 513F to transmit the flow of the data packets received from NIC 513A to the next NIC in data path 502 (i.e., NIC 513D), which is the destination NIC of data path 502, using the appropriate NIC port of NIC 513F that is coupled to NIC 513D.

The data path data for NICs in a path may include flow identification data, for identifying a flow of packets, and flow forwarding data for mapping an identified flow to an output port of the NIC. The flow identification data may include one or more flow parameters and a flow identifier (ID). For example, the first data path data may include first flow parameters that identify a flow and a flow ID for the flow. NICs 513 may use flow parameters to identify packets belonging to a flow. Flow parameters may include one or more n-tuple parameters. Flow parameters for identifying the flow to be transported on a data path 502 may include one or more of a source IP address (SIP) of a source server (e.g., server 512E) associated with a source NIC (e.g., NIC 513E), a destination IP address (DIP) of destination server 512D associated with a destination NIC (e.g., NIC 513D), a source port (SPort) on a source server (e.g., server 512E) for the source application (e.g., application A1), a destination port (DPort) on a destination server (e.g., server 512D) for a destination application (e.g., application A3), and a protocol identifier (PID) that identifies the protocol. Flow parameters may match fields in an IP header and/or tunneling header of packets. Table 1 illustrates an example of flow identification data that may be provided to NIC 513A.

TABLE 1

| Example of flow identification data | |
| --- | --- |
| Flow Parameters (SIP, DIP, SPort, DPort, PID) | Flow ID |
| 10.1.1.1, 20.1.1.1, 100, 200, 6 | Flow_1 |
| 10.1.1.1, 20.1.1.1, 200, 300, 17 | Flow_2 |
| 10.1.1.2, 30.1.1.1, 400, 500, 6 | Flow_3 |

Edge services controller 528 may provide one or more of NICs with a flow forwarding table. Entries of a flow forwarding table for a NIC map a flow identifier to one or more output ports of the NIC. In some examples, a flow forwarding table is specific to a given NIC, for the NIC output ports for a flow will vary NIC-by-NIC according to the topology of NIC fabric 523 and the data path for the flow. An example of a flow forwarding table that may be provided to NIC 513A is shown below. Each flow ID is mapped to one or more next-hop port identifiers associated with a NIC port at that NIC 513A. The NIC port identified by the next-hop port-identifier associated with the flow ID received from edge services controller 528 may communicatively couple NIC 513A to the next NIC 513F in data path 502. For example, the flow identifier "Flow_3" for a flow maps to the next-hop port identifiers Port_10 and Port_12 to implement data path 502.

TABLE 2

| NIC Flow forwarding Table | |
| --- | --- |
| Flow ID | Next-Hop Port Identifier |
| Flow_1 | Port_10 |
| Flow_2 | Port_11, Port_15, Port_16 |
| Flow_3 | Port_10, Port_12 |

When NIC 513A receives a data packet with a header that includes the first set of flow parameters (10.1.1.1, 20.1.1.1, 100, 200, 6) detailed in Table 1, NIC 513A executing fabric service 235 identifies the data packet as belonging to flow ID="Flow_3". NIC 513A executing fabric service 235 may then look up Flow_3 to identify the next-hop port identifier ("Port_14") in the NIC flow forwarding table (Table 2). That is, the flow ID may correspond to the next-hop port identifier Port_14. NIC 513A may therefore transmit the received data packet via the NIC port associated with the next-hop port identifier Port_14 to the next NIC 513F in data path 502.

The following pseudocode may provide some of the steps in flow-based forwarding.

Corresponding instructions for implementing this pseudo code may be comprised by a fabric service 235 executed by a NIC.

Pseudocode Listing 1

```
For each data packet P:
    flow_id=flow_lookup(P→sip,    P→dip,    P→sport,
        P→dport, P→proto)
    next_hop=nh_lookup(flow_id)
    forward the packet to next_hop
endfor
```

Edge services controller 528 may provide source NIC 513E and other NICs 513F in data path 502 with similar data path data that each NIC 513E, 513F may use to identify the next-hop port identifier associated with the NIC port for transmitting data along the data path 502.

Edge services controller 528 may transmit second data path data to source NIC 513E and to each NIC in the second NIC set 513G to implement data path 504. The second data path data transmitted to source NIC 513E may cause source NIC 513E to transmit the data packets having application data generated by source application A2 to the next NIC 513G in data path 504 using the appropriate NIC port. The second data path data transmitted to NIC 513G may cause NIC 513G to transmit the data packets received from source NIC 513E to next NIC 513D in data path 504 using the appropriate NIC port.

Flow identification data of the second data path data may, for example, include second one or more flow parameters a flow ID. The second flow parameters for identifying the flow to be transported on data path 504 may include one or more of a source IP address (SIP) of source server 512E associated with source NIC 512E, a destination IP address (DIP) of destination server 512D associated with destination NIC 513D, a source port (SPort) on source server 512E for the second source application A2, a destination port (DPort) on destination server 512D for the second destination application A4, or a second protocol identifier (PID) that identifies the second protocol.

As described with respect to NIC 513F, source NIC 513E and each NIC in the second NIC set (e.g., NIC 513G) may utilize their respective flow forwarding tables to identify the next-hop port identifier that corresponds to a flow identifier determined for a packet. The NIC port identified by the next-hop port-identifier associated with the NIC flow identifier may communicatively couple that NIC to the next NIC in data path 504.

When, for example, NIC 513G receives a data packet with a header that includes the second flow parameters, NIC 513G may use the flow ID associated with the second flow parameters to identify the next-hop port identifier in the NIC flow forwarding table. The flow ID may correspond to the next-hop port identifier. NIC 513G may transmit the received data packet via the NIC port associated with the next-hop port identifier to the next NIC 513D in data path 504.

In some cases, rather than (or in addition to) identifying physical output ports, flow forwarding tables may specify output virtual interfaces for flows IDs. A virtual interface may represent a VLAN, VxLAN, tunnel (e.g., IP-in-IP, MPLSoGRE, MPLSoUDP), or other virtual interface by which packets for the flow are to be sent. A virtual interface may be configured in the NIC, within the processing unit, or within the host and determine, e.g., encapsulation or other packet processing operations that are to be applied to a packet sent via that virtual interface.

The service-aware routing techniques of this disclosure may provide one or more advantages. For example, as illustrated in FIG. 6, although both flows transported using data paths 502, 504 are sourced by the same server 512E and destined to the same server 512D and would therefore ordinarily be routed along a same path to the destination, the techniques allow system 500 to load balance multiple flows to the same destination for different pairs of applications along different data paths 502, 504. In other words, in a traditional routing environment, packets are forwarded according to the destination IP address. In a service-aware NIC fabric, packets may be classified into various flows based on which service they belong to and then routed based on the flow. Edge services controller 528 programs the forwarding plane on NICs 513 to identify the flows and perform next hop lookups based on the flow ID instead of destination IP, allowing for load balancing by flow (and thus by service).

As another example, by using an indirect flow identifier for mapping flows to output interfaces, rather than mapping packet identification data directly to the output interface, the techniques may allow system 500 to establish paths and easily reuse the paths for multiple different flows. For example, a particular flow ID can be associated with multiple different sets of flow parameters. By updating the flow identification data with additional or different mappings of flow parameters to that flow ID, the system can transport the corresponding additional or different flows on the existing data path to which that flow ID is mapped.

In some examples, a flow can be load balanced by the source NIC across multiple data paths. Rather than having multiple entries in a flow forwarding table mapping the same flow parameters to output ports, the flow identifiers can be shared across the multiple paths by mapping the flow identifiers to the output ports. Splitting the data path data into flow identification data and flow forwarding data thus provides flexibility for load balancing and adding or migrating flows among various paths.

Edge services controller 528 may periodically or in response to a trigger event such as a newly identified flow or the termination of an existing flow, update the data paths 502 and 504. Edge services controller 528 may receive updated resource availability values from each of NICs 513 in NIC fabric 523. Edge services controller 528 may compare the updated resource availability values from each of NICs 513 to suitable NICs 513 for data paths. For example, the NICs with the updated resource availability values that are greater than the resource availability threshold may be identified as NICs that have sufficient available computing resources available to engage in the forwarding stage of data packets.

Thus, in some examples, edge services controller 528 may receive updated resource availability values from NICs 513. Edge services controller 528 may determine, based on the updated resource availability values, an updated data path for the data packets of the flow from the source NIC to the destination NIC via an updated NIC set that comprises at least one NIC of the plurality of NICs. Edge services controller 528 may transmit, to the source NIC and to each NIC in the updated NIC set, the updated data path data to cause the source NIC and each NIC in the updated NIC set to transmit the data packets of the flow from the source NIC to the destination NIC via the updated data path.

Edge services controller 528 may utilize one or more of the identified NICs to orchestrate an updated first data path using an updated first NIC set to transmit data packets from the first source application A1 to the first destination application A3. Edge services controller 528 may transmit updated first data path data associated with the first updated data path to source NIC 513E and each of the NICs in the updated first NIC set. Edge services controller 528 may utilize one or more of the identified NICs to orchestrate an updated second data path using an updated second NIC set to transmit data packets from the second source application A2 to the second destination application A4. Edge services controller 528 may transmit updated second data path data associated with the second updated data path to source NIC 513E and each of the NICs in the updated second NIC set.

Figure 7:
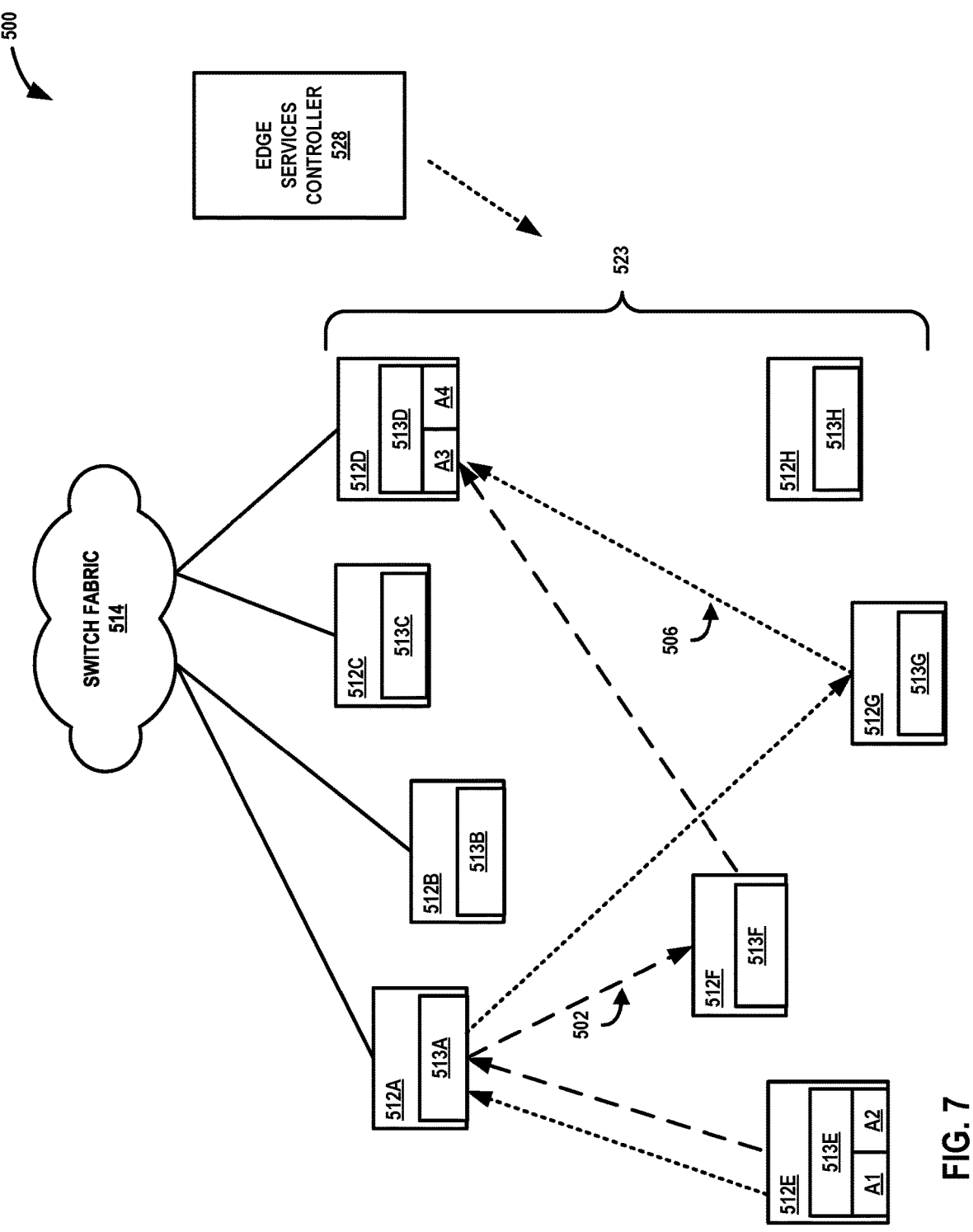
FIG. 7 is a block diagram illustrating the example system of FIG. 5 illustrating two different data paths orchestrated by an edge services controller to route data packets having application data generated by the first source application and configured in accordance with the first protocol to a first destination application, according to techniques of this disclosure.

FIG. 7 is a block diagram of example system 500 of FIG. 5, illustrating two different data paths 502, 506 orchestrated by edge services controller 528 to route data packets having application data generated by a first source application A1 and configured in accordance with the first protocol to a first destination application A3, in accordance with techniques of this disclosure. The use of two different data paths may be used to implement load balancing.

Edge services controller 528 may orchestrate data paths 502, 506 during the orchestration stage. Edge services controller 528 may receive resource availability values from each of NICs 513 in NIC fabric 523. Edge services controller 528 may select NICs based on the resource availability values. For example, edge services controller 528 may compare the received resource availability values from each of NICs 513 with the resource availability threshold. Those NICs 513A, 513F, 513G with resource availability values that are greater than the resource availability threshold may be identified as NICs 513A, 513F, 513G that have sufficient available computing resources available to engage in the forwarding stage of data packets. Edge services controller 528 may use the identified NICs 513A, 513F, 513G to orchestrate data paths 502, 506.

Edge services controller 528 may orchestrate data path 502 to transmit data packets generated by first source application A1 in accordance with a first protocol from source NIC 513E at source server 512E to first destination application A3 through the destination NIC 513D at the destination server 512D via a first NIC set 513A, 513F. Data path 506 may be orchestrated by edge services controller 528 to transmit data packets generated by source application A1 in accordance with a first protocol from source NIC 513E at source server 512E to the same first destination application A3 through the destination NIC 513D at destination server 512D via a second NIC set 513A, 513G.

Because source server 512E, source NIC 513E, source application A1, destination server 512D, destination NIC 513D, and destination application A3 may be the same for both data path 502 and data path 506, the same plurality of flow parameters may be associated with both data path 502 and data path 506. The plurality of flow parameters may include a source IP address (SIP) of source server 512E associated with source NIC 512E, a destination IP address (DIP) of destination server 512D associated with destination NIC 513D, a source port address (SPort) of the first source application A1 configured to generate the data packets in accordance with the first protocol at the source server 512E, a destination port address (Dport) of first destination application A3 configured to receive the data packets configured in accordance with the first protocol, and a first protocol identifier (PID) associated with the first protocol.

There may be overlap between the first data path and the second data path. For example, source NIC 513E may transmit all data packets generated by source application A1 to NIC 513A. Edge services controller 528 may transmit the plurality of flow parameters and a single NIC flow ID to source NIC 513E. The NIC flow ID may correspond to the next-hop port identifier in the NIC flow forwarding table at source NIC 513E. Source NIC 513E may transmit the data packets that include the plurality of flow parameters in the header to next NIC 513A via the NIC port associated with the next-hop port identifier.

NIC 513A may transmit received data packets that include the plurality of flow parameters in the header to NIC 513F along data path 502 or to NIC 513G along data path 506. NIC 513A may be referred to as a "common NIC." Edge services controller 528 may transmit the plurality of flow parameters and a single flow ID ("Flow_1") in connection with both data path 502 and data path 506 to NIC 513A. Table 3 illustrates an example of data path data that edge services controller 528 may provide to NIC 513A.

TABLE 3

| Example of NIC Data Path Data | |
| --- | --- |
| Flow Parameters (SIP, DIP, SPort, DPort, PID) | NIC Flow ID |
| 10.1.1.1, 20.1.1.1, 100, 200, 6 | Flow_1 |

In the example, the flow forwarding table (Table 2) for NIC 513A may indicate that NIC flow ID "Flow_1" corresponds to the next-hop port identifier "10" and the next-hop port-identifier "Port_14." The next-hop port identifier "Port_14" may identify the NIC port that provides communicatively coupling to next NIC in data path 502 (i.e., NIC 513F) and the next-hop port identifier "Port_10" may identify the NIC port that provides communicatively coupling to the next NIC in data path 506 (i.e., NIC 513G).

When NIC 513A receives a data packet with a header that includes the plurality of flow parameters, NIC 513A may use the flow ID "Flow_1" associated with the plurality of flow parameters to identify the next-hop port identifier "Port_10" and the next-hop port identifier "Port_14" in the flow forwarding table (Table 2).

NIC 513A may implement load balancing by transmitting a first percentage of the received data packets including the plurality of flow parameters as a header via the NIC port associated with the next-hop port identifier Port_14 to the next NIC 513F in data path 502 and a second percentage of the received data packets including the plurality of flow parameters as a header via the NIC port associated with the next-hop port identifier Port_10 to the next NIC 513G in data path 506.

Because NIC 513E processes both Flow_1 and Flow_3, the data path data used for fabric service 235 of NIC 513E will include the flow parameters and flow identifier for each of Flow_1 and Flow_3.

Edge services controller 528 may provide NIC 513F in data path 502 with the plurality of flow parameters and a flow ID that may cause NIC 513F to look up the next-port-hop identifier associated with flow ID in the look-up table and use the NIC port associated with the next-hop port identifier to transmit received data packets including the plurality of flow parameters as a header via the NIC port associated with the next-hop port identifier to the next NIC 513D, the destination NIC, in data path 502. Edge services controller 528 may provide NIC 513G in data path 506 with the plurality of flow parameters and a flow ID that may enable NIC 513G to look up the next-port-hop identifier associated with the flow ID in the look-up table and use the NIC port associated with the next-hop port identifier to transmit received data packets including the plurality of flow parameters as a header via the NIC port associated with the next-hop port identifier to the next NIC 513D, the destination NIC, in data path 506.

FIG. 8 is a flowchart for an example method 800 performed by edge services controller 528 according to techniques of this disclosure. Edge services controller 528 manages data packet routing in NIC fabric 523, which comprises a plurality of NICs 513 coupled by communication links in a NIC fabric topology. In the example of FIG. 8, edge services controller 528 receives resource availability values from NICs 513 (802). Edge services controller 528 determines a data path (e.g., data path 502) for data packets of a flow transported using a protocol from a source NIC (e.g., NIC 513E in the example of FIG. 5) to a destination NIC (e.g., NIC 513D in the example of FIG. 5) via a NIC set that comprises at least one NIC (804). In some examples, the protocol is a tunneling protocol or a transport layer protocol. The plurality of NICs 513 includes the source NIC, the destination NIC, and the NIC set. As part of determining the data path, edge services controller 528 may select the NIC set based on the resource availability values. For instance, edge services controller 528 may select NICs in the NIC set based on the resource availability values received from the selected NICs being greater than a NIC resource availability threshold. In some examples, the data path does not include a physical switch other than NICs of the plurality of NICs.

Edge services controller 528 transmits data path data to the source NIC and to each NIC in the NIC set to cause the source NIC and each NIC in the NIC set to identify the data packets of the flow using an identifier of the protocol and to transmit the data packets of the flow from the source NIC to the destination NIC via the data path (808). In some examples, the data path data identifies the data packets of the flow using a source port of a source application and a destination port of a destination application. The source application and the destination application may each comprise one of a NIC application or a host application. Furthermore, in some examples, the data path data comprises a flow identifier of the flow and a set of one or more flow parameters for identifying the data packets of the flow. The set of flow parameters may comprise one or more of a source IP address of a source server associated with the source NIC, a destination IP address of a destination server associated with the destination NIC, a source port of a source application that generates application data of the data packets of the flow, a destination port of a destination application, or the identifier of the protocol. The data path data sent to the source NIC may comprise a mapping from the flow identifier of the flow to a next-hop port identifier of a NIC port of the source NIC.

In some examples, e.g., to perform load balancing, edge services controller 538 may further determine a second data path for the data packets of the flow transported using the protocol from the source NIC to the destination NIC via a second NIC set. In such examples, the second NIC set includes at least one NIC of the plurality of NICs. As part of determining the second data path, edge services controller 538 may select the second NIC set based on the resource availability values. Edge services controller 538 may transmit to the source NIC and to each NIC in the second NIC set, second data path data to cause the source NIC and each NIC in the second NIC set to identify the data packets of the flow using the identifier of the protocol and to transmit the data packets of the flow from the source NIC to the destination NIC via the second data path. In examples where the first NIC set and the second NIC set include a common NIC, edge services controller 538 may, as part of transmitting the first data path data, transmit a first next-hop port identifier to the common NIC. Additionally, as part of transmitting the second data path data, edge services controller 538 may transmit a second next-hop port identifier to the common NIC to enable the common NIC to implement load balancing by routing the data packets to the destination NIC via both the first data path using a first NIC port associated with the first next-hop port identifier and the second data path using a second NIC port associated with the second next-hop port identifier. In this example, the set of flow parameters may comprise one or more of a source IP address of a source server associated with the source NIC, a destination IP address of a destination server associated with the destination NIC, a source port address of a source application configured to generate application data to be transported in the data packets, a destination port address of a destination application configured to receive the data packets, or a protocol identifier associated with the protocol. The source application operates at the source server. The flow identifier corresponds to the first next-hop port identifier and the second next-hop port identifier to enable the common NIC to route data packets that include the set of flow parameters via the first common NIC port and the second common NIC port. A relationship between the flow identifier and the first and second next-hop port identifiers is defined in a common look-up table previously provided to the common NIC by the edge services controller.

Edge services controller 538 may orchestrate data packets associated with different protocols with different data paths. Thus, in some such examples, edge services controller 538 may determine a second data path for data packets of a second flow transported using a second protocol from the source NIC to the destination NIC via a second NIC set. The second NIC set comprises one or more NICs of the plurality of NICs different from the NICs in the first NIC set. As part of determining the second data path, edge services controller 538 may select the second NIC set based on the resource availability values associated with the plurality of NICs. Edge services controller 538 may transmit, to the source NIC and to each NIC in the second NIC set, second data path data to cause the source NIC and each NIC in the second NIC set to identify the data packets of the second flow using an identifier of the second protocol and to transmit the data packets of the second flow from the source NIC to the destination NIC via the second data path. In this example, the second data path data may comprise a second set of one or more flow parameters for identifying data packets of the second flow and a flow identifier of the second flow. The second set of flow parameters may comprise one or more of a source IP address of a source server associated with the source NIC, a destination IP address of a destination server associated with the destination NIC, a source port address of a second source application that generates application data of the data packets of the second flow, a destination port address of a second destination application, or the identifier of the second protocol. The second data path data transmitted to the source NIC may comprise a mapping from the flow identifier of the second flow to a next-hop port identifier of a NIC port of the source NIC.

Figure 9:
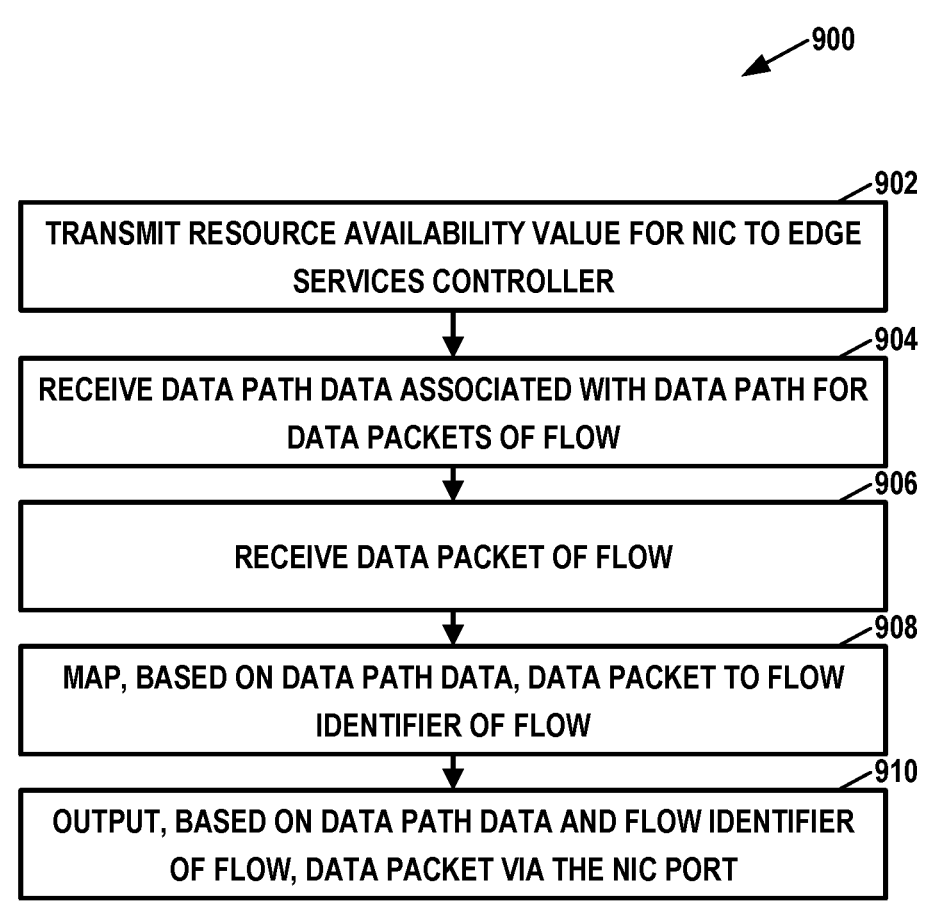
FIG. 9 is a flowchart for an example method performed by a NIC according to techniques of this disclosure.

FIG. 9 is a flowchart for an example method 900 performed by a NIC according to techniques of this disclosure. The NIC may include one or more NIC ports, a processor, and a memory comprising instructions that, when executed by the processor, cause the NIC to perform various actions. The example method of FIG. 9 may be performed by any of NICs 13 or NICs 513. In the example of FIG. 9, the NIC transmits a resource availability value of the NIC to an edge services controller (902). Additionally, the NIC may receive, from edge services controller 528, data path data associated with a data path for data packets of a flow transported using a protocol from a source NIC in NIC fabric 23, 523 to a destination NIC in NIC fabric 23, 523 (904). The data path may be computed using the resource availability value of the NIC and the data path data comprises a flow identifier of the flow mapped to a next-hop port identifier of the NIC port. In some examples, the data path data identifies data packets of the flow using a source port of a source application and a destination port of a destination application.

In some examples, the data path data comprises the next-hop port identifier, the flow identifier of the flow, and a set of one or more flow parameters for identifying data packets of the flow. The set of flow parameters may comprise one or more of a source IP address of a source server associated with the source NIC, a destination IP address of a destination server associated with the destination NIC, a source port of a source application that generates application data of the data packets, a destination port of a destination application, or an identifier of the protocol. In such examples, the data path data may comprise a mapping from the flow identifier of the flow to the next-hop port identifier of the NIC port.

Furthermore, the NIC may receive a data packet of the flow (906). The NIC may map, based on the data path data, the data packet to the flow identifier of the flow (908). The NIC may then output, based on the data path data and the flow identifier of the flow, the data packet via the NIC port (910).

In some examples, the data path is a first data path, the flow is a first flow, the data path data is first data path data, the flow identifier is a first flow identifier, and the NIC is a first NIC, the NIC further comprises a second NIC port, and the NIC may receive, from edge services controller 538, second data path data associated with a second data path for data packets of the flow. The second data path data comprises the flow identifier of the flow mapped to a second next-hop port identifier. Subsequently, the NIC may receive a second data packet of the flow. The NIC may map, based on the second data path data, the second data packet to the flow identifier of the flow. The NIC may then output, based on the second data path data and the flow identifier of the flow, the second data packet via the second NIC port. The second data path data may comprise the set of flow parameters and the second next-hop port identifier. The flow identifier of the flow may correspond to both the first next-hop port identifier and the second next-hop port identifier to enable the NIC to implement load balancing by routing data packets to the destination NIC via both the first data path and the second data path.

The operating system on a NIC (e.g., one of NICs 513A-513H) that controls a processing unit of the NIC may be independent of a server operating system. Thus, the forwarding plane of the NIC may run independently of the host server. This host server independence may allow a NIC to provide forwarding support for another host server if necessary. A NIC may be an extension of the network attached to a server, where with the aid of a controller, switches and routers can offload some tasks to the NIC(s). As with other applications that are managed by the network management software, access to the control, management and monitoring of traffic that ingresses and egresses a NIC may allow for a better managed networking experience. In addition, troubleshooting, predictive and proactive analytics may be driven end to end through the control of the NIC software and its management as though it were part of the larger network fabric.

For example, and as seen in FIG. 1, edge services controller 28 may perform (in some cases in conjunction with or under direction of controller 24) fabric management and orchestration of services executing within any of the processing units. Edge services controller 28 may apply application analytics and automation using, e.g., metrics collected from ESP agents or from services executing on the processing units of the NICs.

A NIC processing unit may be seen as an appendage of the server or an extension of the network. For the operating system/hypervisor and infrastructure (storage/network) functionality which can be realized through the NIC processing unit driver, it is seen as a server accelerator. From the perspective of the network, it is a networking platform which is distributed (present on each server), flexible (in terms of services it can provide), and fully manageable and orchestrated as part of the network.

Treating the NIC processing unit (and it executing the software running thereon) as an extension of the network may have a number of advantages including an ability to turn on/off or load/unload network services for incoming and outgoing traffic without having to update the operating system/hypervisor. This may include use of techniques like SR-IOV for these services to communicate directly with applications (e.g., VNFs/CNFs) which run on top of the x86 OS/hypervisor. Other advantages may include an ability to exploit new capabilities on a NIC processing unit without having to update the OS driver and orchestrate network services across multiple NIC processing units across various servers based on application requirements (where the OS does not play a part in applications). This may work across multiple servers and potentially across multiple racks or even data centers depending upon the scope. With a processing unit kernel 237 and an ability to tap into the container ecosystem (ARM-based containers), a number of services may be introduced onto the processing unit without having to rely on the operating system. The server acceleration function (e.g., storage offload) may be orchestrated through the network and its telemetry managed via the network since the end-to-end traffic enabled by this acceleration (e.g., NVMeOF, over RDMA, etc.) runs over the network anyway. Additional network awareness through the fabric management for this end-to-end traffic acceleration may be another possible enhancement. In-band network telemetry (e.g., INT) may be used from the NIC processing units for performance measurement and tuning. This may happen directly from the network. Same with additional probes (e.g., via NetRounds) for application aware telemetry. In effect, through a network of managed and orchestrated processing units, an edge services platform may address the requirements of applications.

Figure 10:
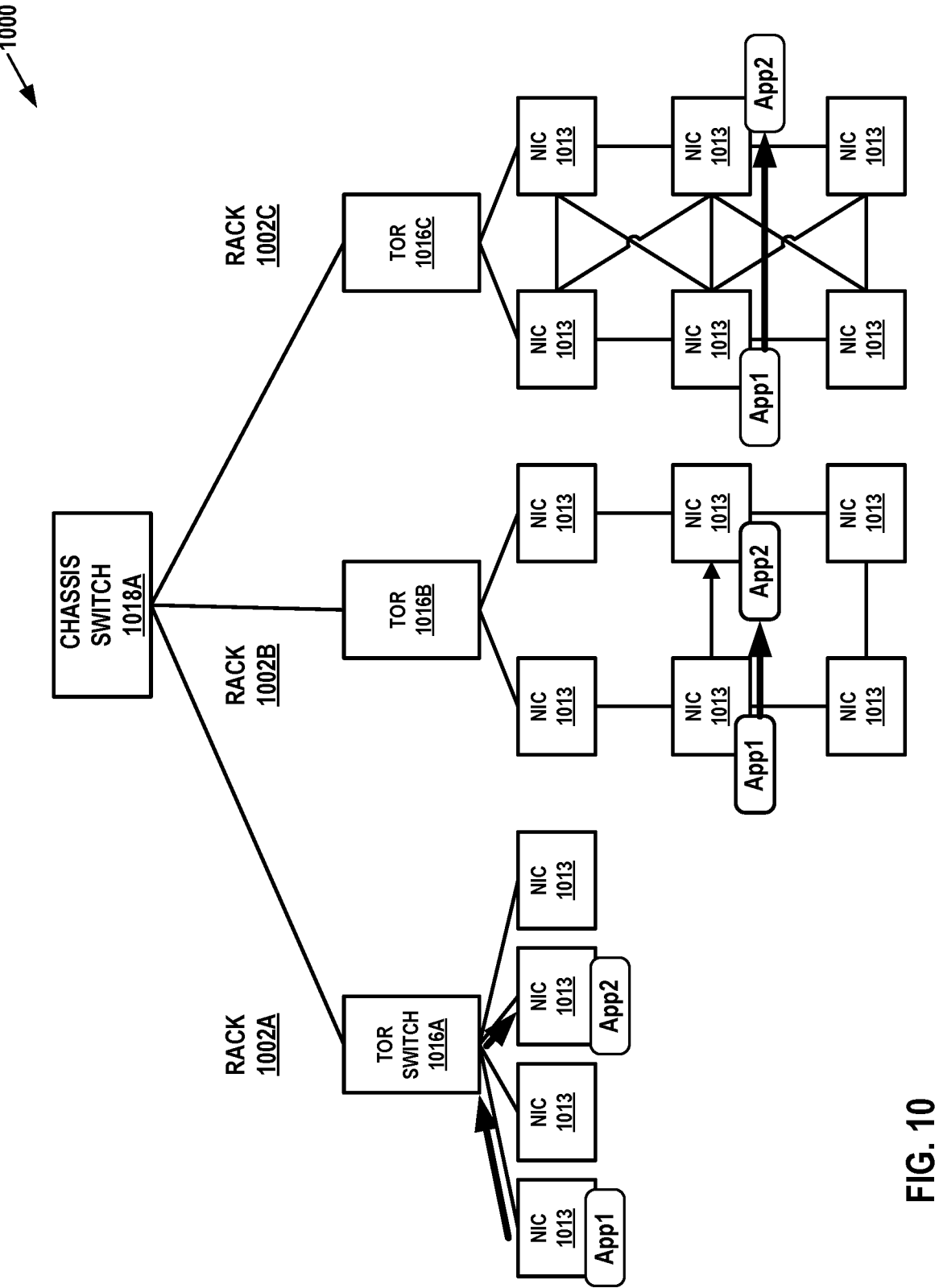
FIG. 10 is a conceptual diagram illustrating a data center having servers connected by a switch fabric, with NICs forming independent NIC fabrics, according to techniques of this disclosure.

FIG. 10 is a diagram illustrating a data center 1000 having servers connected by a switch fabric, with NICs 1013 forming independent NIC fabrics. The servers are not shown in FIG. 10. A single Edge Services Platform (ESP) controller (edge services controller 28, 528) can manage one or more datacenters. Data center 1000 includes three racks: rack 1002A, 1002B, and 1002C (collectively, "racks 1002"). Each of racks 1002 includes one of TOR switches 1016A-1016C (collectively, "TOR switches 1016") and a set of NICs 1013.

FIG. 10 shows three different kinds of connectivity between NICs and TOR switches 1016 in each of racks 1002. Specifically, NICs 1013 and TOR switch 1016A of rack 1002A have traditional datacenter connectivity in which every NIC is directly connected to a TOR switch port. In this configuration, a first application (App1) and a second application (App2) only communicate through TOR switch 1016A, which may increase latency.

NICs 1013 and TOR switch 1016B of rack 1002B have application latency optimized connectivity. Thus, some NICs 1013 of rack 1002B are connected to TOR switch 1016B. The remaining NICs 1013 of rack 1002B have indirect connectivity to TOR switch 1016B. Hence, in rack 1002B, App1 and App2 may directly communicate with each other through a back-to-back NIC connection.

NICs 1013 and TOR switch 1016C of rack 1002C are the same as rack 1002B but with the addition of high availability using multiple connections between NICs 1013 of rack 1002C. In other words, there may be additional connections between NICs 1013 of rack 1002C, potentially allowing even lower latency for communication between applications running on processing units of computing devices containing NICs 1013 of rack 1002C.

Figure 11:
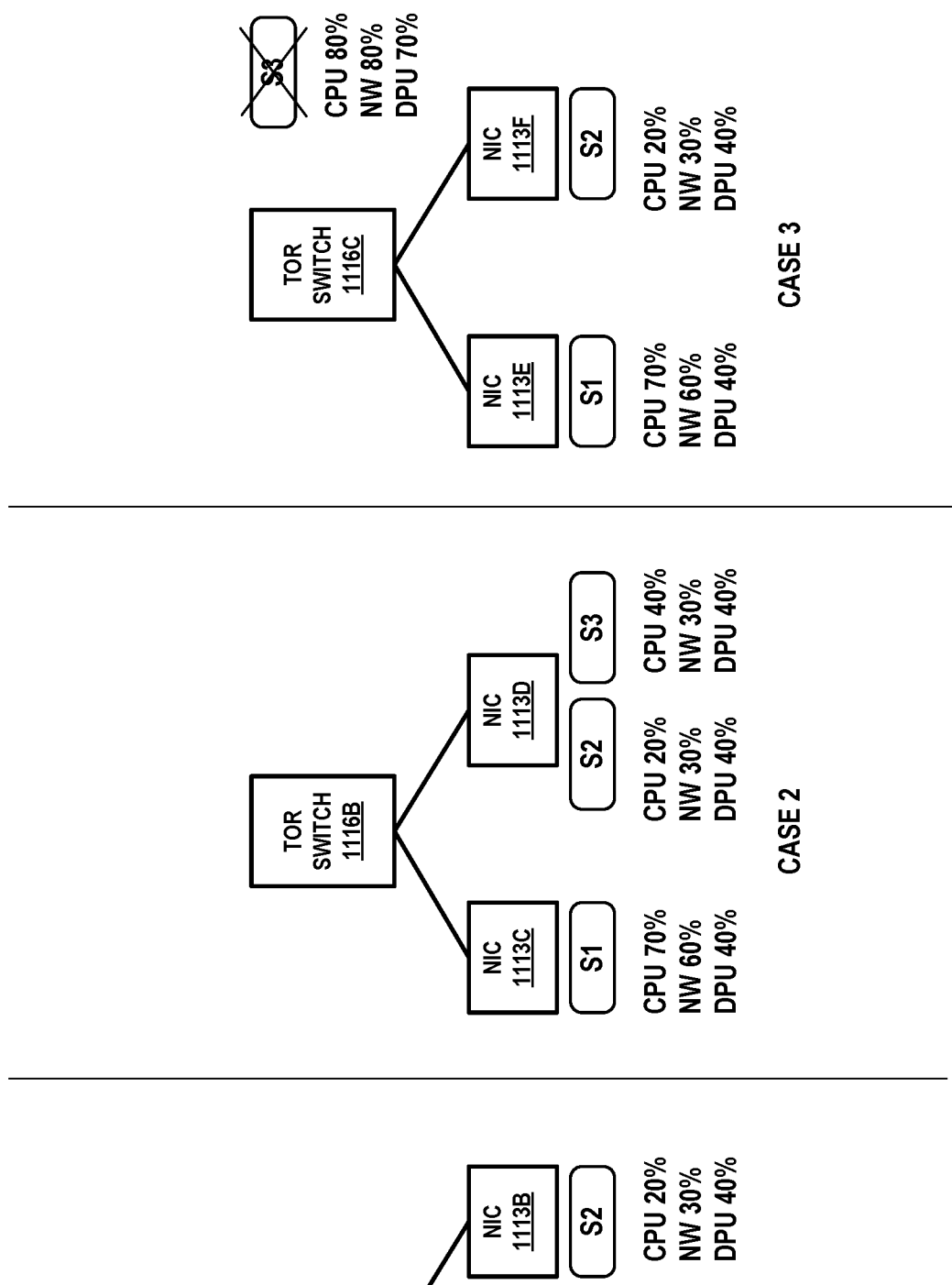
FIG. 11 is a conceptual diagram illustrating another example network with TOR switches connected to NICs.

FIG. 11 illustrates another example network 1100 with TOR switches 1116A-1116C connected to NICs, according to techniques of this disclosure. This disclosure may refer to TOR switches 1116A-1116C collectively, as "TOR switches 1116." In the example of FIG. 11, NICs 1113A, 1113B are connected to TOR switch 1116A. NICs 1113C, 1113D are connected to TOR switch 1116B. NICs 1113E, 1113F are connected to TOR switch 1116C. This disclosure may refer to NICs 1113A-1113F collectively, as "NICs 1113." Each of NICs 1113 may be a "SmartNIC" having a processing unit. One or more host computing devices may include one or more of NICs 1113. In a data center, an edge services platform (ESP) controller (e.g., edge services controller 28 (FIG. 1) may provide an Application Programming Interface (API)-based service deployment platform. ESP users can make an API call with the service name and its associated service level agreements (SLAs) for the service deployed on one or more of NICs 1113. A SLA for a service may indicate resource requirements to be dedicated to the service. The following data structure is an example showing some of the SLA parameters:

```
SLA {
    CPU_resources,
    network_bandwidth,
    latency,
    hardware_acceleration_resources,
    number_of_instances
}
```

In other examples, the SLA for a service may include more, fewer, or different SLA parameters.

Edge services controller 28 may use the SLA for a service to automatically deploy the service in a SmartNIC fabric. In a fully loaded system, edge services controller 28 may have to migrate some of the services from one NIC to another to accommodate new requests to deploy services. To simplify the discussion, the rest of this document focuses on four primary SLAs, CPU utilization (CPU), network bandwidth requirements (NW), hardware acceleration requirements/ capabilities (SmartNIC processing unit), and latency. FIG. 11 shows these cases. In Case 1, two services, S1 and S2, are currently running in the NIC fabric. In the example of FIG. 11, the SLA of service S1 indicates a requirement of 70% of CPU resources, 60% of network resources, and 40% of DPU resources. The SLA of service S2 indicates a requirement of 20% of CPU resources, 30% of network resources, and 40% of DPU resources. If a new request comes in to deploy a service S3 in the NIC fabric, edge services controller 28 may or may not be able to accommodate the request to deploy service S3, depending on the SLAs of services S1, S2, and S3.

In Case 2, the SLA of service S3 indicates a requirement of 40% of CPU resources, 30% of network resources, and 40% of DPU resources. Thus, in the example of FIG. 11, the SLA of service S3 can be accommodated on one of the NICs (NIC 1113D) using the available resources of NIC 1113D. However, in Case 3, the SLA of service S3 indicates a requirement of 80% of CPU resources, 80% of network resources, and 70% of DPU resources. Thus, even though there are enough resources available in the NIC fabric, the request to deploy service S3 on the NIC fabric cannot be met due to fragmentation of resources between NICs 1113E and 1113F. In other words, service S3 cannot be deployed on either of NIC 1113E or NIC 1113F.

FIG. 12 is a conceptual diagram illustrating an example of resource overcounting in a network. Resource overcounting is another problem in addition to fragmentation. FIG. 12 shows two cases: Case 1 and Case 2. In case 1, NICs 1213A and 1213B are connected to a TOR switch 1216, NIC 1213C is connected to NIC 1213A, and NIC 1213D is connected to NIC 1213B. In case 2, NICs 1213E and 1213F are connected to TOR switch 1216B, NIC 1213G is connected to NIC 1213E, and NIC 1213H is connected to TOR switch 1213F. This disclosure may refer to NICs 1213A-1213H collectively as, "NICs 1213."

Not all resources of NICs 1213 are available to run services. For instance, some of the resources of NICs 1213 may be reserved to provide basic L2/L3 functionality (or additional management/telemetry functionality) on behalf of the same NIC or some other NIC. In case 1 of FIG. 12, three services, S1, S2, and S3 with different SLAs are deployed on NICs 1213A, 1213B, and 1213D, respectively. The SLA of service S1 indicates 50% of CPU resources, 60% of network resources, and 40% of DPU resources. The SLA of service S2 indicates 40% of CPU resources, 40% of network resources, and 40% of DPU resources. The SLA of service S3 indicates 80% CPU resources, 80% network resources, and 60% DPU resources. The SLA of a service S4 indicates 80% CPU resources, 80% network resources, and 70% DPU resources.

As shown in case 2, when edge services controller 28 receives a request to deploy service S4, even though NIC 1213F has no services running, service S4 cannot be deployed on NIC 1213F because service S3 running on NIC 1213H uses 80% of the network resources of NIC 1213F for forwarding traffic to TOR switch 1216B.

In accordance with techniques of this disclosure, edge services controller 28 may address the above problems by calculating direct (running services) and indirect (traffic forwarding) resource usage of a NIC and may use linear programming techniques to find the best possible deployment scenario:

nic_resource_usage=Σlocal_SLAs+Σexternal_SLAs

Edge services controller 28 may use configuration parameters to compute resource utilization of local_SLAs. Machine learning techniques (i.e., forecasting) can be used to dynamically predict the usage of service at any time. Local SLAs of a NIC are SLA of services on the NIC. External SLAs of a NIC are SLAs of services of NICs upstream on data paths through the NIC.

Figure 13:
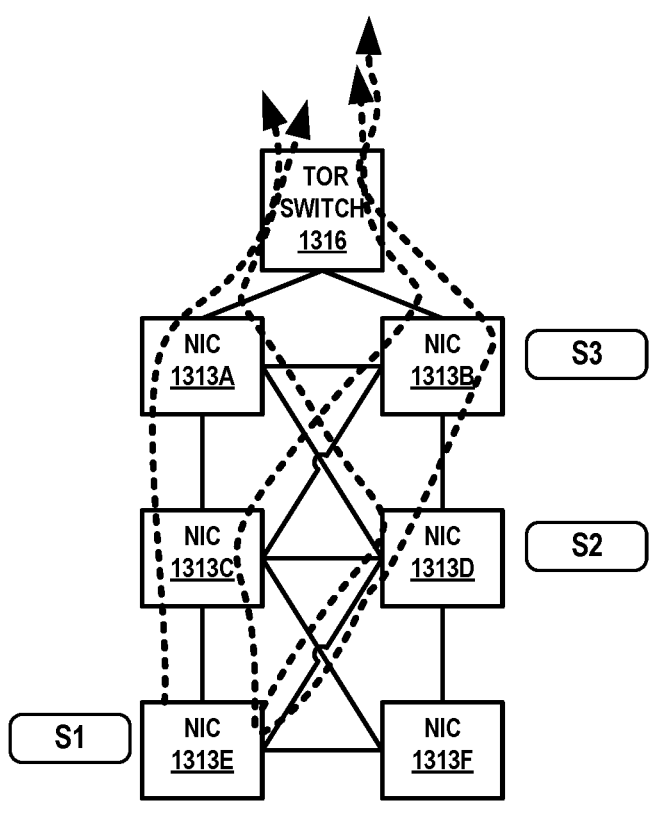
FIG. 13 is a conceptual diagram illustrating example multi-path NIC connectivity in a NIC fabric.

As shown in FIG. 12, traffic patterns in the fabric influence SLAs of any NIC. A more complex connectivity can be found in FIG. 13. FIG. 13 is a conceptual diagram illustrating example multi-path NIC connectivity in a NIC fabric. In the example of FIG. 13, a NIC fabric includes NICs 1313A-1313F (collectively, "NICs 1313"). NIC 1313A and NIC 1313B have physical connections to a TOR switch 1316. In the example of FIG. 13, traffic of a service S1 originated on NIC 1313E can take various paths to reach the outside world via TOR switch 1316. Some of the factors that influence a packet path include:

Routing tables

L3 Equal Cost Multi-Path (ECMP) Hash

L2 Link Aggregation Group (LAG) Hash

Location of the destination service

Thus, in some examples, a system may comprise a plurality of servers comprising respective NICs connected by physical links in a physical topology. Each NIC of the plurality of NICs may comprise an embedded switch and a processing unit coupled to the embedded switch. An edge services platform controller may be configured to compute expected resource usage of resources of a NIC of the plurality of NICs by a service instance and by packet forwarding by the network interface card. Based on the expected resource usage, the edge services platform controller may select the processing unit of the network interface card to execute the service instance. The edge services platform controller may deploy the service instance to the processing unit of the NIC.

Figure 14:
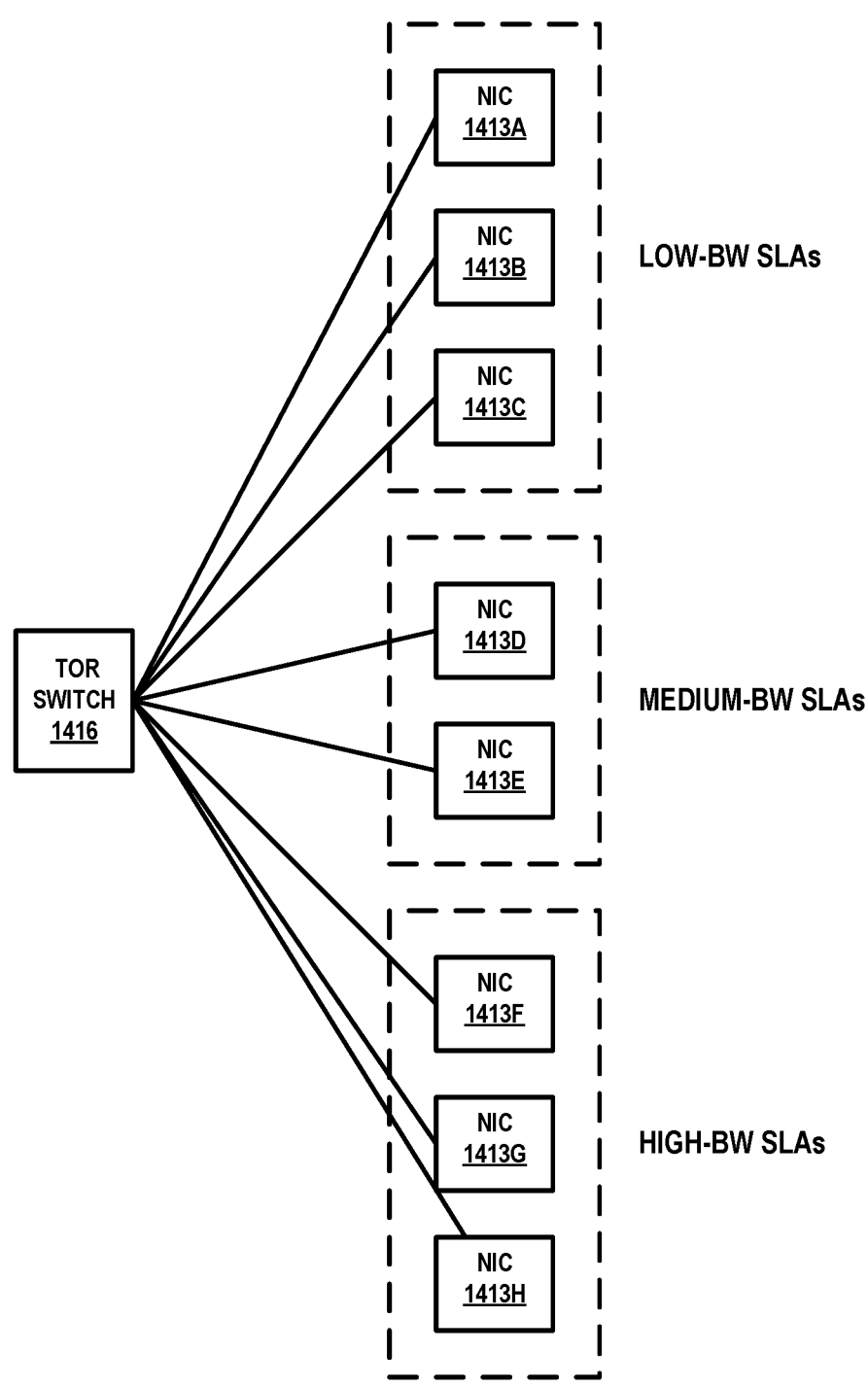
FIG. 14 is a conceptual diagram illustrating example groups of NICs where each group of NICs runs a different kind of SLA to avoid fragmentation of resources, according to techniques of this disclosure.

Create multiple groups of NICs where each group runs a different kind of SLAs to avoid fragmentation of resources, as shown in FIG. 14. FIG. 14 is a conceptual diagram illustrating example groups of NICs where each group of NICs runs a different kind of SLA to avoid fragmentation of resources, according to techniques of this disclosure. In the example of FIG. 14, NICs 1413A-1413H (collectively, "NICs 1413") have physical links to a TOR switch 1416. An edge services controller (e.g., edge services controller 28) may group NICs 1413 into groups based on bandwidth requirements of SLAs of services on NICs 1413. In the example of FIG. 14, the edge services controller has grouped NICs 1413A, 1413B, and 1413C into a low-bandwidth ("LOW-BW") SLA group, grouped NICs 1413D and 1413E into a medium bandwidth ("MEDIUM-BW") SLA group, and grouped NICs 1413F, 1413G, and 1413H into a high bandwidth ("HIGH-BW) SLA group.

As discussed above, FIG. 5 depicts a NIC fabric 523, which may be an example of NIC fabric 23 of FIG. 1. NIC fabric 523 has a physical topology representing a graph of NICs 513 and physical links directly connecting pairs of NICs 513. The physical topology may include an IP fabric 520 and links connecting NICs 513 to IP fabric 520. In accordance with techniques of this disclosure, edge services controller 528 may reduce and in some cases eliminate the need for TOR switches in small data centers by intelligently connecting NICs 513 to each other, as shown in FIG. 5.

In a rack using one or more TOR switches, a TOR switch's only purpose may be to forward data between servers. However, in a smart fabric with edge services controller 528, each NIC may have a primary goal to provide networking support to the applications running on a server that contains the NIC. In addition, if there are any networking resources left over, a NIC can act as a NIC fabric forwarder. This means that a NIC's fabric-forwarding ability may depend on the SLAs of the applications running on the NIC's host server. According to techniques of this disclosure, edge services controller 528 may dynamically configure NIC fabric 523 by using telemetry data and SLAs of NICs 513.

Figure 15:
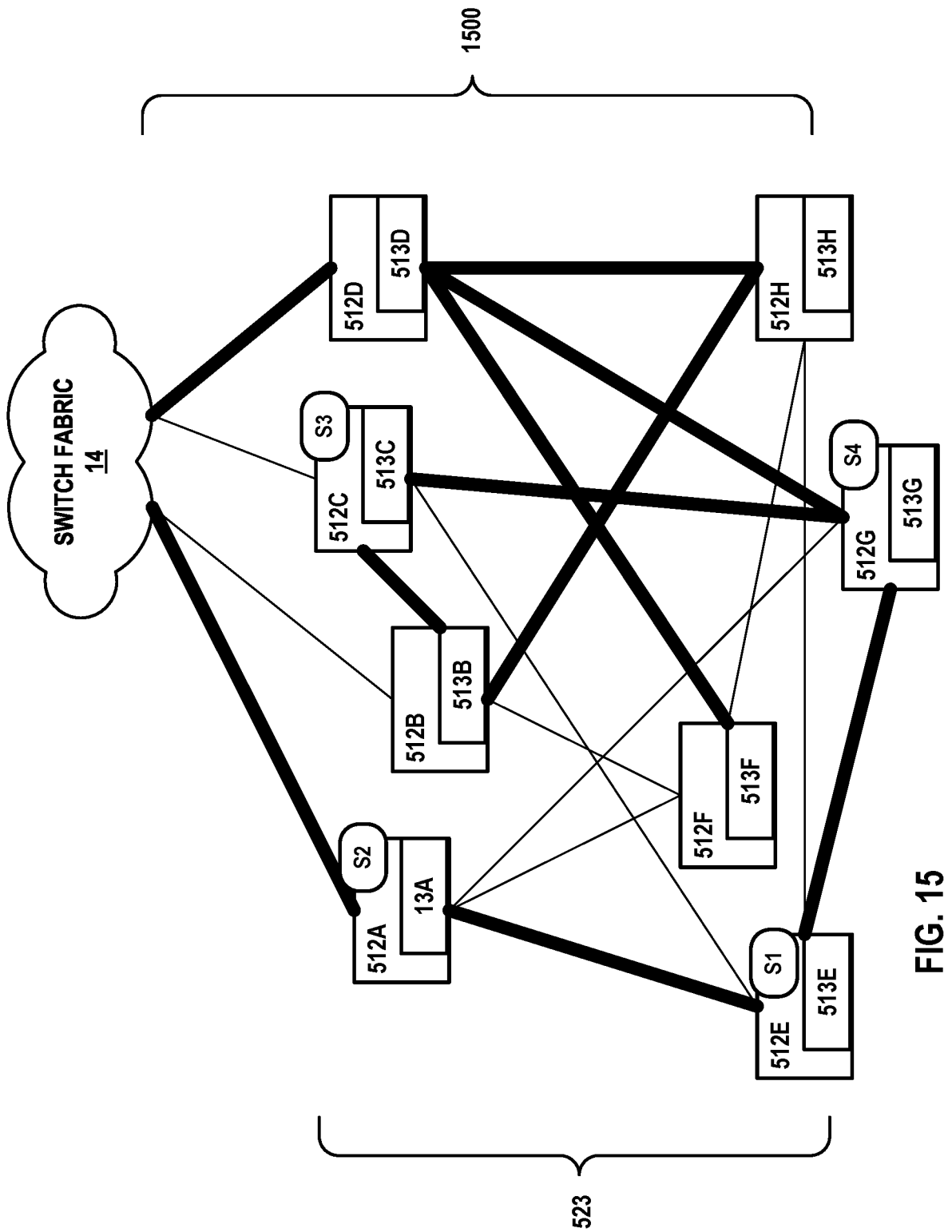
FIG. 15 is a conceptual diagram illustrating a first example dynamic smart fabric created by an edge services controller, according to techniques of this disclosure.
Figure 16:
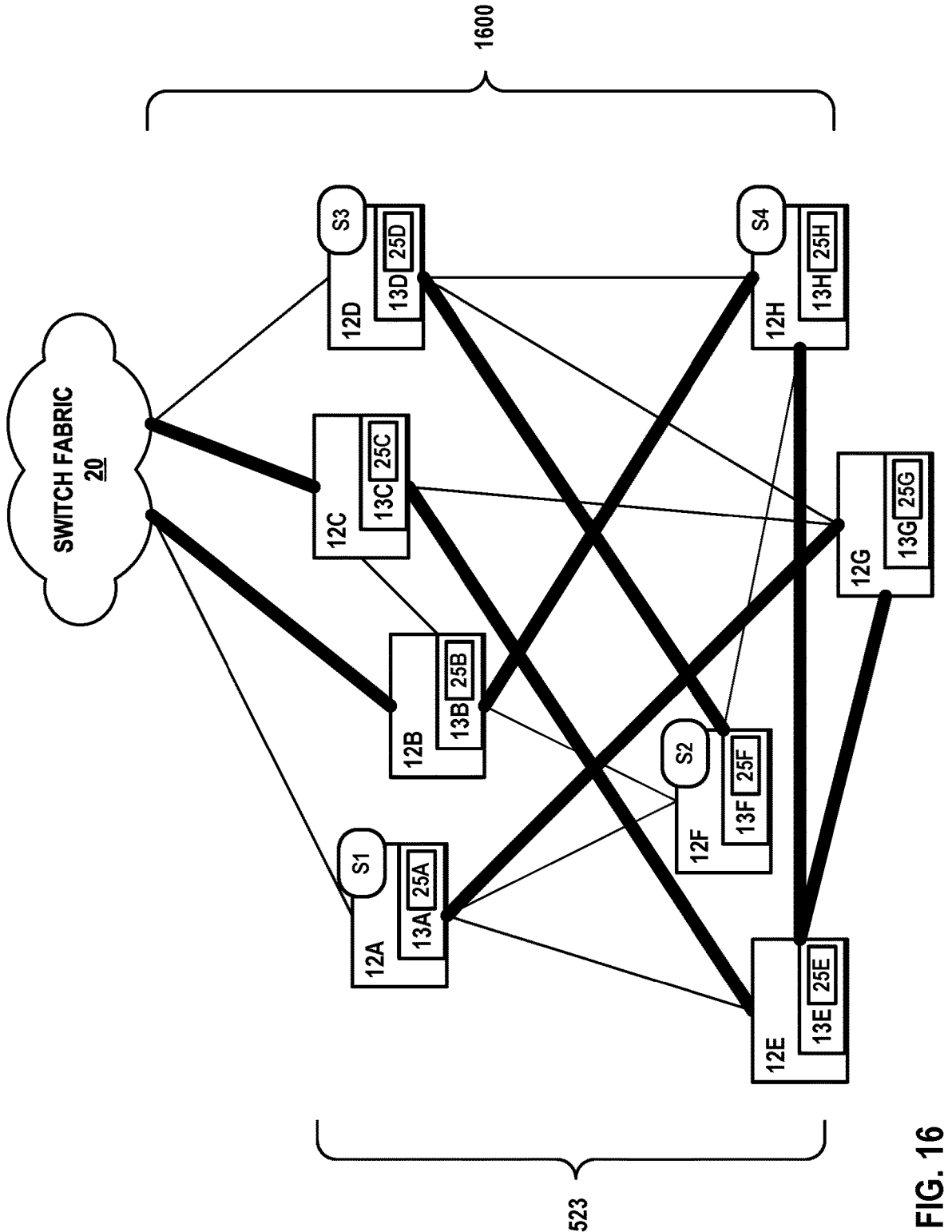
FIG. 16 is a conceptual diagram illustrating a second example dynamic smart fabric created by an edge services controller, according to techniques of this disclosure.

FIG. 15 is a conceptual diagram illustrating a first example dynamic smart fabric 1500 created by an edge services controller 528, according to techniques of this disclosure. FIG. 16 is a conceptual diagram illustrating a second example dynamic smart fabric 1600 created by edge services controller 528, according to techniques of this disclosure. The bold links are the active links that configured to make up smart fabrics 1500, 1600. For example, smart fabric 1500 includes an active link that connects NIC 513A to NIC 513E and an active link that connects NIC 513A to switch fabric 14. A link is "active" as part of a smart fabric configured in NICs 513 if there is a processing unit 525, for a NIC 513 that is directly coupled to the link, that has forwarding or other information configured thereon that causes the processing unit 525 to use the link for forwarding network packets.

Figure 17:
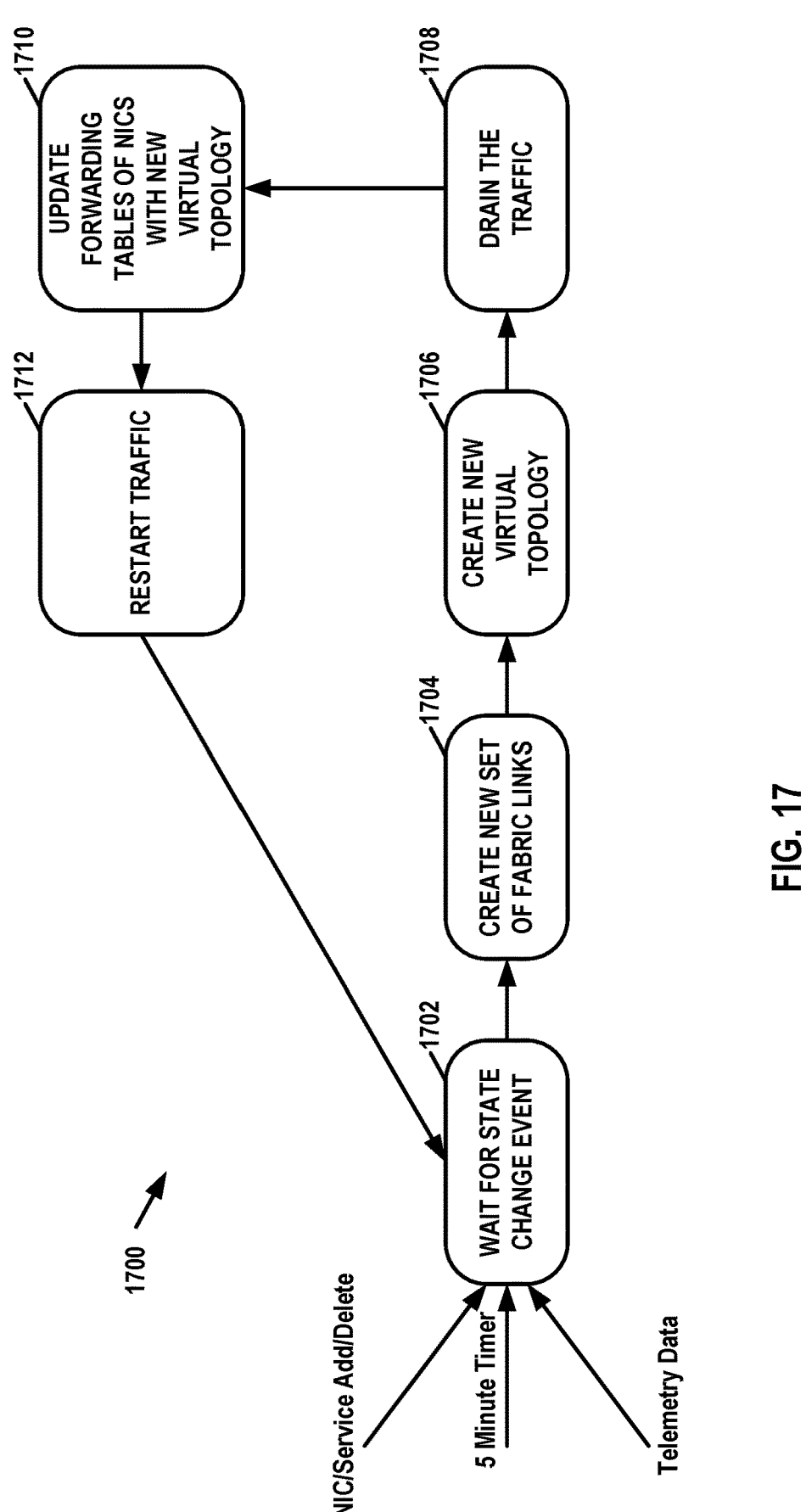
FIG. 17 is a conceptual diagram illustrating an example state machine for creating a smart fabric, according to techniques of this disclosure.

Edge services controller 528 may use a state machine to generate a smart fabric, such as the example state machine in FIG. 17. FIG. 17 is a conceptual diagram illustrating an example state machine 1700 for creating a smart fabric, according to techniques of this disclosure. Edge services controller 538 may initially be in a state 1702 in which edge services controller 538 waits for a state change event. Example state change events shown in FIG. 17 include NIC or service additions or deletions ("NIC/Service Add/Delete"), expiration of a 5-minute timer, and changes in telemetry data. In other examples, the timer has durations other than 5 minutes.

services controller 528 may instruct the NICs to resume forwarding data packets in the NIC fabric according to the new virtual topology. After restarting traffic in the NIC fabric, edge services controller 528 may transition back to state 1702 in which edge services controller 528 waits for another state change event.

An example algorithm applied by edge services controller 528 for generating a smart fabric based on the resources available at each NIC as shown in pseudocode listing 2:

Pseudocode Listing 2

```
do
    SI = {set of all internal NICs}
    SE = {set of all external NICs − connected to IP fabric / gateway / data center leaf
    switch(es)}
    FL = { } // fabric links
    foreach NIC N in SI + SE {
        resources_used = f(SLAs of N, telemetry of N)
        resources_avail = 100 − resources_used
        if resources_avail <= 25
            add one random link of N to FL
        else if resource_avail <= 50
            add two random links of N to FL
        else if resource_avail <= 75
            add three random links of N to FL
        else
            add all links of N to FL
    }
    sort SE in ascending order of resource availability
    add external links from top 50% of NICs in SE to FL
    foreach N in SI + SE {
        compute SPF from N to every other node and external networks
    }
while is_a_connected_graph(FL) != TRUE
```

When a state change event occurs, edge services controller 528 transitions to a state 1704 in which edge services controller 528 creates a new set of fabric links. After creating the new set of fabric links, edge services controller 528 transitions to a state 1706 in which edge services controller 528 creates a new virtual topology based on the set of fabric links. In some examples, edge services controller 528 may use a shortest path first (SPF) algorithm to create the new virtual topology. After creating the new virtual topology, edge services controller 528 transitions to a state 1708 in which edge services controller 528 drains traffic from the NICs. In other words, edge services controller 528 prevents new data packets from entering the NIC fabric, e.g., by instructing the NICs to queue data packets received from services or external networks, while allowing the NICs to continue forwarding packets already in the NIC fabric. After draining the traffic, edge services controller 528 may transition to a state 1710 in which edge services controller 528 updates forwarding tables of the NICs (e.g., all of the NICs or some of the NICs) with the new virtual topology. After edge services controller 528 has updated the forwarding tables of the NICs, edge services controller 528 may transition to a state in which edge services controller 528 restarts traffic in the NIC fabric. For instance, edge By picking links at random, the above algorithm may ensure that set FL creates a single connected graph. That is, the smart fabric topology will not be disjoint. The various thresholds for resource availability level tests and "top 50%" in the above algorithm may be configurable or dynamically adjustable.

Edge services controller 528 may configure the processing units of the NICs (e.g., processing units 525 of NICs 513) to implement the computed smart fabric such that the NICs can use the links connecting one another to forward traffic edge services without affecting the other network traffic, which may have priority.

For example, edge services controller 528 may use the algorithm described above and depicted in FIG. 17 to determine that the link between NIC 13C and NIC 13G should be part of smart fabric 1030A, in part because this provides a shortest path between service S3 and service S4 executing on processing units 525C and 525G, respectively. Edge services controller 528 may configure, in processing unit 525C, a forwarding entry that maps a network interface associated with NIC 513G to the physical link connecting NIC 513C and NIC 513G. In this way, NIC 513C will forward packets destined for the network interface to NIC 13G. In some cases, the forwarding entry may map a virtual network interface associated with service S4 to the physical link connecting NIC 513C and NIC 513G, in similar fashion.

Figure 18:
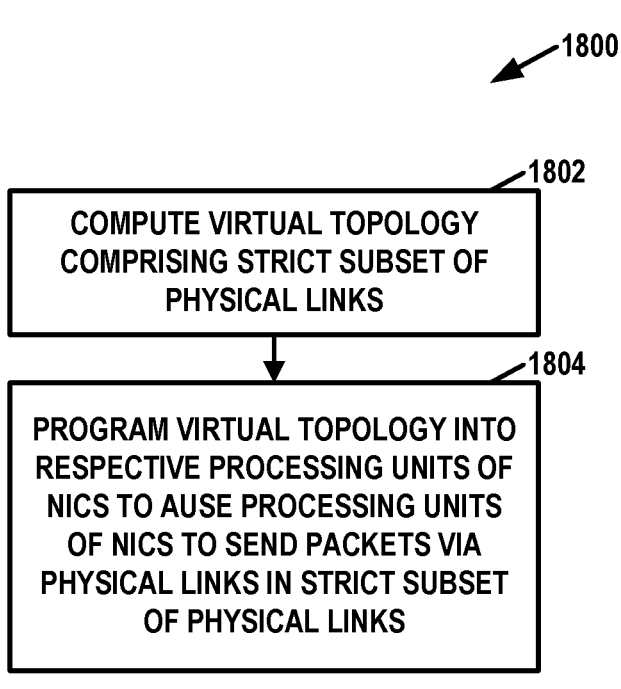
FIG. 18 is a flowchart illustrating an example operation for configuring NICs to use a virtual topology, according to techniques of this disclosure.

FIG. 18 is a flowchart illustrating an example operation 1800 for configuring NICs to use a virtual topology, according to techniques of this disclosure. In the example of FIG. 18, edge services controller 538 computes, based on a physical topology of physical links that connect a plurality of NICs (e.g., NICs 513) that comprise embedded switches (e.g., such as Ethernet bridge 234 of FIG. 2) and processing units (e.g., processing units 25, 525, etc.) coupled to the embedded switches, a virtual topology comprising a strict subset of the physical links (1802). The strict subset of the physical links is "strict" in the sense that the subset of the physical links does not includes all of the physical links.

Edge services controller 538 may program the virtual topology into the respective processing units of the NICs to cause the processing units of the NICs to send data packets via physical links in the strict subset of the physical links (1804). For example, edge services controller 538 may send data link data to the NICs that configure the NICs to forward data packets on data paths defined by the virtual topology. In some examples, the data packets may be exchanged by services executed by the processing units of the NICs.

Figure 19:
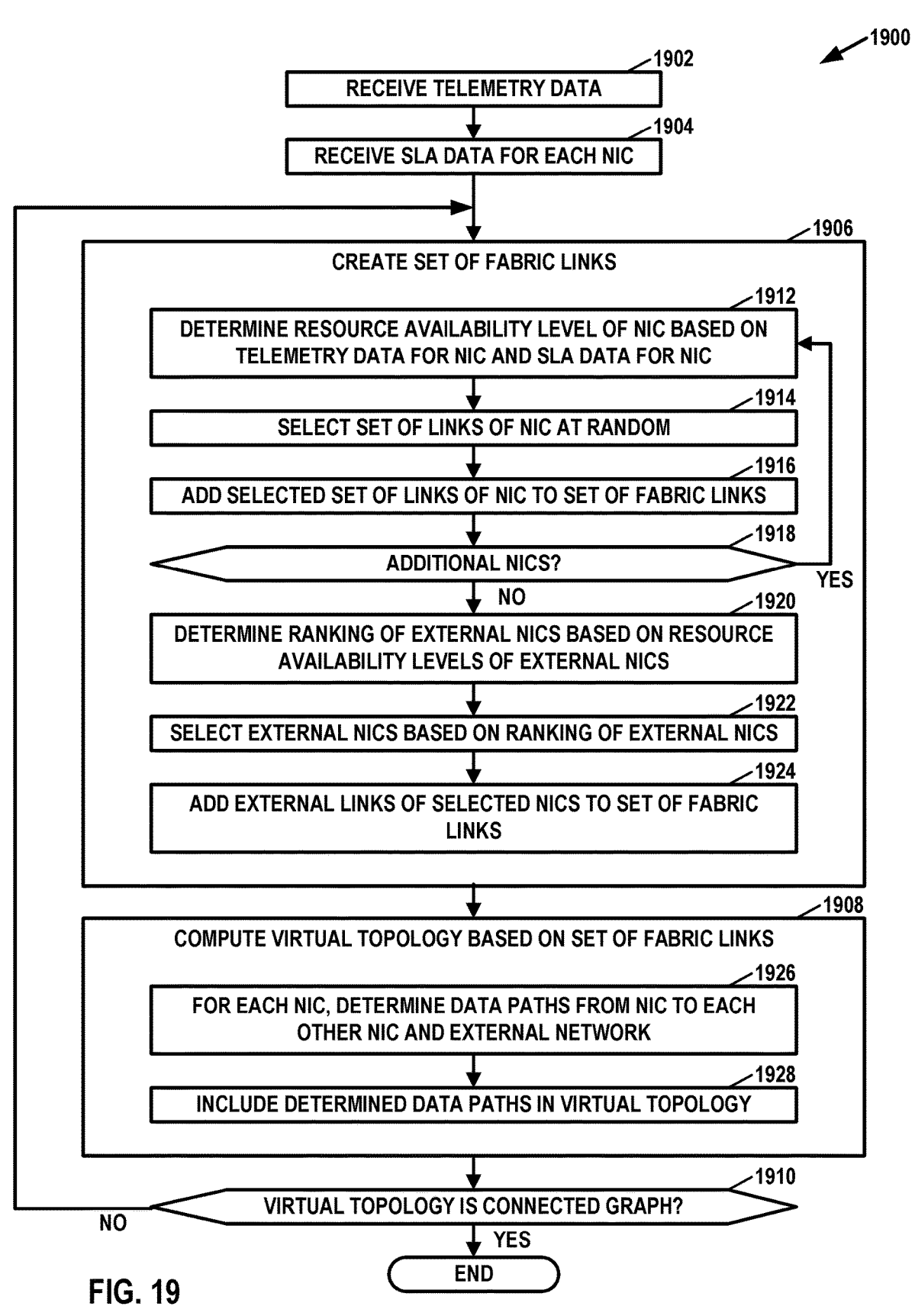
FIG. 19 is a flowchart illustrating an example operation for generating a virtual topology, according to techniques of this disclosure.

FIG. 19 is a flowchart illustrating an example operation 1900 for generating a virtual topology, according to techniques of this disclosure. In the example of FIG. 19, edge services controller 538 may receive telemetry data for each NIC in a plurality of NICs (e.g., NICs 513) (1902). The telemetry data may include resource utilization information, such as network bandwidth utilization, central processing unit utilization, data processing unit utilization, and so on. Additionally, in the example of FIG. 19, edge services controller 538 may receive SLA data for NICs in the plurality of NICs (1904). SLA data for a NIC may indicate resource utilization levels that the NIC has committed for use to specific services or groups of services.

Edge services controller 538 may perform a loop until the virtual topology is a connected graph. A connected graph is a graph in which each node (e.g., each NIC, host, applicable external network, etc.) is reachable via one or more paths through the graph. As part of performing an iteration of the loop, edge services controller 538 may create a set of fabric links (1906), compute the virtual topology based on the set of fabric links (1908), and determine whether the computed virtual topology is a connected graph (1910). If edge services controller 538 determines that the virtual topology is not a connected graph ("NO" branch of 1910), edge services controller 538 may perform another iteration of the loop, thereby creating another set of fabric links and computing another virtual fabric based on the set of fabric links. On the other hand, if edge services controller 538 determines that the virtual topology is a connected graph ("YES" branch of 1910), the process of computing the virtual topology may be complete. When the process of computing the virtual topology is complete, edge services controller 538 may drain traffic from the NICs, update the forwarding tables of the NICs with the virtual topology, and restart traffic in the NICs, e.g., as shown in the example of FIG. 17.

As part of creating the set of fabric links, edge services controller 538 may determine a resource availability level of a NIC based on the telemetry data for the NIC and SLA data for the NIC (1912). In the pseudocode listing 2, the resource availability level is denoted as "resources_avail" and edge services controller 538 may determine the resource availability level as:

resources_used=f(SLAs of N, telemetry of N)
    resources_avail=100−resources_used In this pseudocode snippet, f( . . . ) is a function that outputs a value based on the SLA data of a NIC N and telemetry data of the NIC N.

Furthermore, edge services controller 538 may select a set of links of the NIC at random (1914). The set of links of the NIC may be the physical connections of the NIC to other NICs or devices. The number of selected links in the set of links is based on the resource availability level of the NIC. Edge services controller 538 may add the selected set of links of the NIC to the set of fabric links (1916). In pseudocode listing 2, edge services controller 538 selects the set of links of the NIC and adds the selected set of links of the NIC to the set of fabric links as shown in the following snippet:

if resources_avail<=25
        add one random link of N to FL
    elseif resource_avail<=50
        add two random links of N to FL
    elseif resource_avail<=75
        add three random links of N to FL
    else
        add all links of N to FL Edge services controller 538 may then determine whether there are additional NICs to process (1918). If there are additional NICs to process ("YES" branch of 1918), edge services controller 538 may repeat steps 1912, 1914, and 1916 with respect to another one of the NICs.

The plurality of NICs may include a set of one or more internal NICs and a set of one or more external NICs. Internal NICs may be NICs that connect to other NICs in a NIC fabric and not devices (e.g., TOR switches) external to the NIC fabric. External NICs may be NICs that have connections to devices external to the NIC fabric and connections to NICs in the NIC fabric. If there are no additional NICs to process ("NO" branch of 1918), edge services controller 538 may determine a ranking of external NICs in the plurality of NICs based on the resource availability levels of the external NICs (1920). Edge services controller 538 may select one or more of the external NICs based on the ranking of the external NICs (1922). for example, edge services controller 538 may select the top 50% or other percentage of the external NICs. Edge services controller 538 may add external links of the selected NICs to the set of fabric links (1924). In pseudocode listing 2, steps 1920, 1922, and 1924 may correspond to the following pseudocode snippet:

sort SE in ascending order of resource availability
    add external links from top 50% of NICs in SE to FL Furthermore, in the example of FIG. 19, as part of computing the virtual topology based on the set of fabric links, edge services controller 538 may, for each NIC in the plurality of NICs, determine data paths from the NIC to each other NIC in the plurality of NICs and an external network (1926). In some examples, such as the example of FIG. 17, edge services controller 538 may, as part of determining the data paths from the NIC to each other NIC in the plurality of NICs and the external network, apply a SPF algorithm to determine the data paths from the NIC to each other NIC in the plurality of NICs and the external network. Edge services controller 538 may include the determined data paths in the virtual topology (1928). In pseudocode listing 2, steps 1926 and 1928 may correspond to the following pseudocode snippet:

```
foreach N in SI + SE {
    compute SPF from N to every other node and external networks
}
```

The forwarding element is the core of any networking switch, which provides features like switching, routing, QoS, etc. The programmable variant of this forwarding element is called a Network Processor (NP) and the fixed-feature variant is called an Application-Specific Integrated Circuit (ASIC). An NP allows developers to use high level languages like C to program the forwarding element (e.g., chip), which allows devices based on NPs to support various features that customers may request. On the other hand, an ASIC provides fixed functionality, which may allow the ASIC to run up to 10 times faster than an NP. In recent years, ASICs based on a new programmable language called P4 have been developed, which allows limited programmability while giving ASIC-equivalent speeds. Customers using these P4-based switches can add support for new protocols by applying software upgrades to the ASIC.

Even though ASICs equipped to use P4 (i.e., "P4 chips" or "P4-based chips") solved some of the issues seen with ASICs, P4-based chips have a few drawbacks. For example, adding a new feature to P4-based chips requires power cycling the P4-based chip, which may cause network disruptions. In another example, P4-based chips have limited on-chip memory. In another example, the P4 language has limited capabilities. For instance, the P4 language lacks arithmetic operations, loops are not present in P4 language, and so on. Even though P4-based chips promise programmability over ASICs, their deployment is still limited due to above limitations. Other programming languages for programming ASICs may include OpenFlow.

Figure 20:
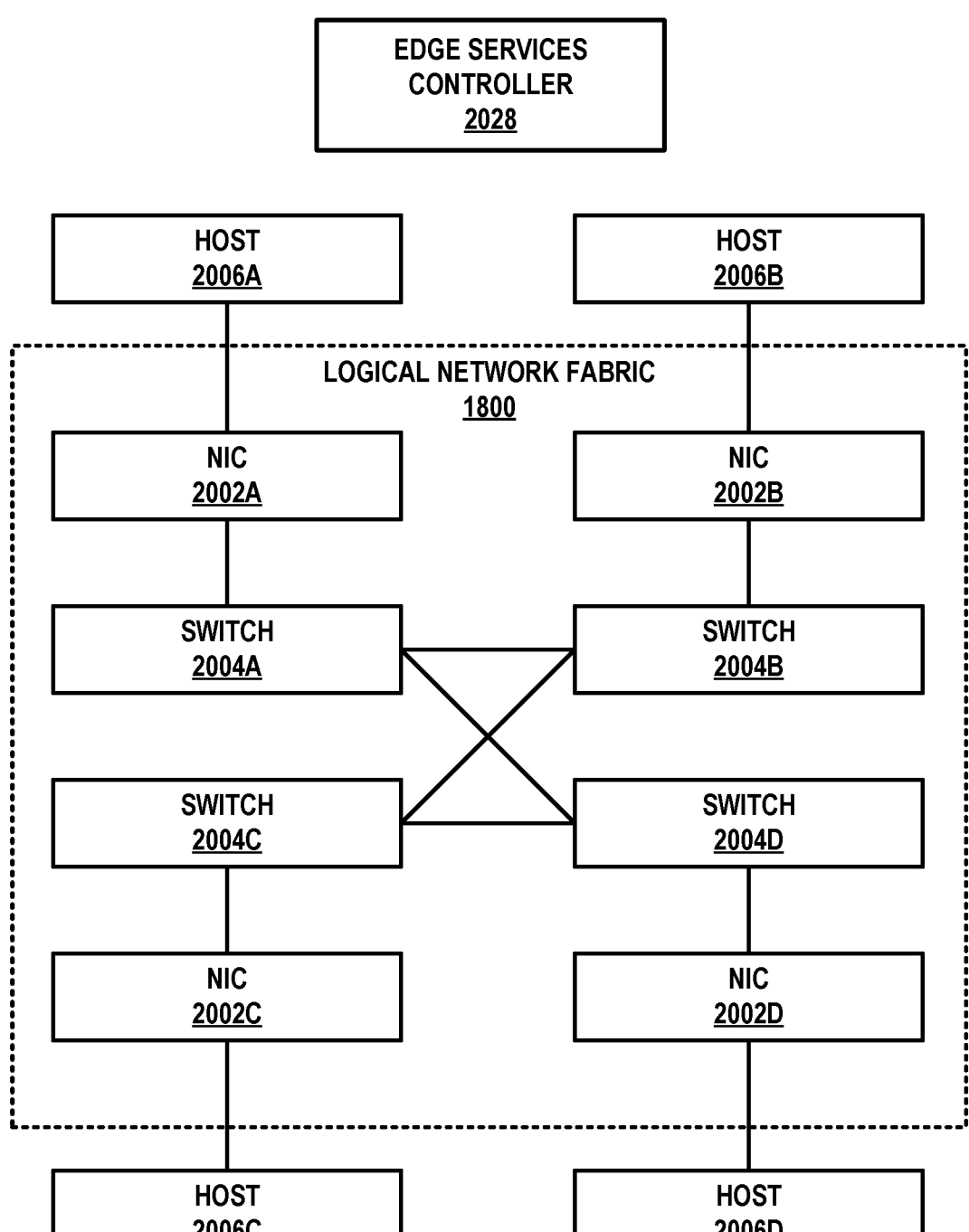
FIG. 20 is a conceptual diagram illustrating an example logical network fabric, according to techniques of this disclosure.

To solve these issues, an edge services platform (e.g., edge services controller 28 of FIG. 1) may create a logical network fabric by combining smart NICs (i.e., NICs having processing units) and switches where NICs would work as an extension of network switches. FIG. 20 is a conceptual diagram illustrating an example logical network fabric 2000, according to techniques of this disclosure. In the example of FIG. 20, logical network fabric includes NICs 2002A-2002D (collectively, "NICs 2002"). NICs 2002 include switches 2004A-2004D (collectively, "switches 2004"). One or more servers may include NICs 2002. NIC 2002A is communicatively coupled to a host 2006A, NIC 2002B is communicatively coupled to a host 2006B, NIC 2002C is communicatively coupled to a host 2006C, and NIC 2002D is communicatively coupled to a host 2006D. This disclosure may refer to hosts 2006A, 2006B, 2006C, and 2006D collectively as "hosts 2006." In the example of FIG. 20, an edge services controller 2028 may program NICs 2002 to create logical network fabric 2000. Edge services controller 2028 may be implemented in accordance with any of the examples provided elsewhere in this disclosure with respect to edge services controllers 28, 528, etc.

Switches 2004 include one or more switches with ASICs, such as P4-based chips. In accordance with techniques of this disclosure, the switches with ASICs can offload unsupported features to smart NICs (e.g., NICs 2002). For example, to support a specific tunneling protocol that a switch (e.g., a P4-based chip) does not support, the switch may offload tunnel encapsulation and decapsulation to a smart NIC. In other words, the smart NIC may encapsulate and decapsulate data packets according to the specific tunneling protocol. This is possible because the smart NIC has a processing unit that is programmable to modify the data packets to encapsulate and decapsulate the data packets according to the specific tunneling protocol.

Thus, in accordance with techniques of this disclosure, a system may include a plurality of servers comprising respective NICs (e.g., NICs 2002) connected by physical links in a physical topology. Each NIC of NICs 2002 comprises an embedded switch (e.g., one of switches 2004) and a processing unit coupled to the embedded switch. Edge services controller 2028 may be configured to program the processing unit of a NIC (e.g., one of NICs 2002) to receive a data packet via a first network interface of the NIC, modify the packet to generate a modified data packet, and output the modified data packet via a second network interface of the NIC. For example, edge services controller 2028 may be configured to program the processing unit of the NIC to modify a segment routing header of the data packet to include the modified segment routing header. In some examples, the first network interface may be coupled to a physical link connected to a physical device comprising at least one of a network switch, network router, firewall, load balancer, network address translation device, physical network function, or network device, and the second network interface is coupled to a second physical link connected to the physical device.

Figure 21:
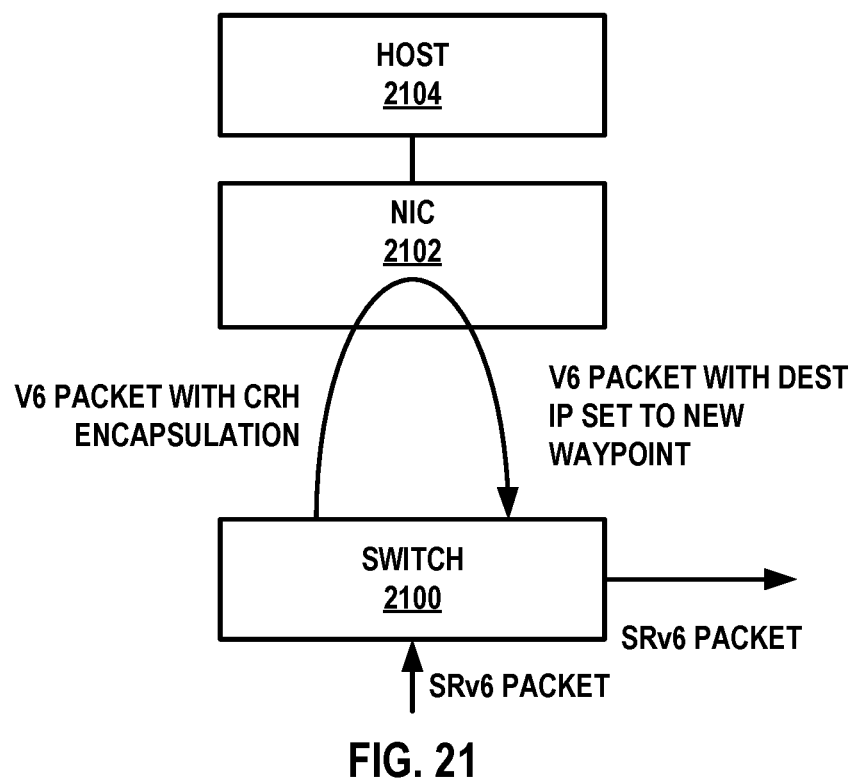
FIG. 21 is a conceptual diagram illustrating an example of Compressed Routing Header (CRH) encapsulation of Segment Routing version 6 (SRv6) packets, according to techniques of this disclosure.

FIG. 21 is a conceptual diagram illustrating an example of Compressed Routing Header (CRH) encapsulation of Segment Routing version 6 (SRv6) packets, according to techniques of this disclosure. The CRH protocol compresses SRv6 waypoint addresses into 16-bit numbers, which are converted to an actual IP address at each waypoint. CRH is an example of a proprietary protocol that is not supported by all network devices. Therefore, some switches may not be equipped to handle CRH data packets. An edge services platform can solve this problem by offloading CRH processing to a smart NIC. For instance, in the example of FIG. 21, a switch 2100 is not equipped to modify SRv6 data packets with CRH encapsulation to change destination IP sets of the SRv6 data packets to new waypoints. Accordingly, when switch 2100 receives a SRv6 data packet with CRH encapsulation, switch 2100 may send the SRv6 data packet to a NIC 2102. NIC 2102 may be included in or communicatively coupled to a host 2104. A processing unit of NIC 2102 may modify the SRv6 data packet so that the destination IP set of the SRv6 data packet has a new waypoint. NIC 2102 may send the modified SRv6 data packet back to switch 2100. NIC 2102 may then send modified SRv6 data packet to switch 2100 via a different network interface than the network interface on which NIC 2102 received the SRv6 data packet. Switch 2100 may then forward the modified SRv6 data packet.

Figure 22:
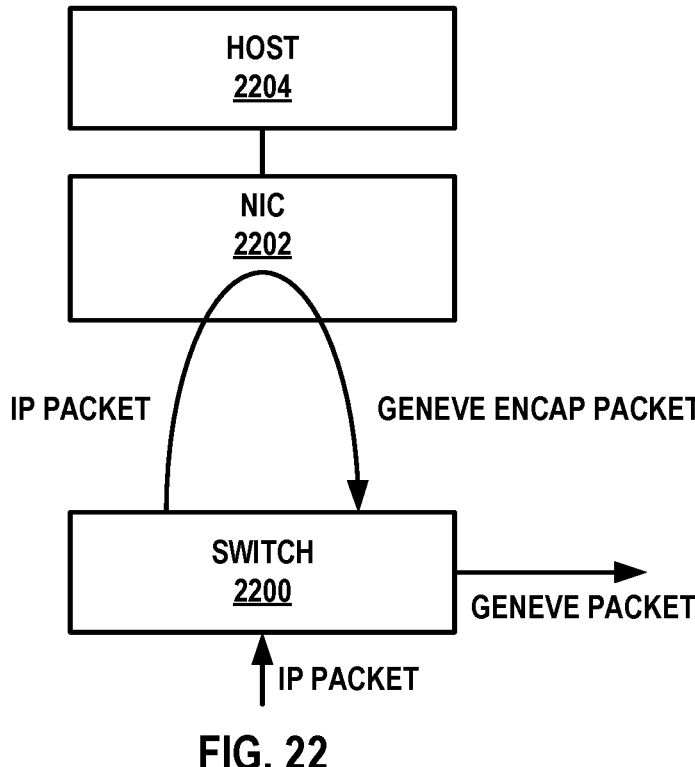
FIG. 22 is a conceptual diagram illustrating an example of Geneve encapsulation of Internet Protocol (IP) packets, according to techniques of this disclosure.

Similar mechanisms can be applied to new protocols like Geneve, etc., as shown in the example of FIG. 22. FIG. 22 is a conceptual diagram illustrating an example of Geneve encapsulation of IP packets, according to techniques of this disclosure. In the example of FIG. 22, a switch 2200 receives an IP packet. An edge services controller may configure switch 2200 to forward specific IP packets to a NIC 2202. NIC 2202 may be included in or communicatively coupled to a host 2204. Additionally, the edge services controller may program a processing unit of NIC 2202 to encapsulate the IP packets according to the Geneve protocol. Thus, when NIC 2202 receives an IP packet from switch 2200, NIC 2202 modifies the IP packet to encapsulate the IP packet according to the Geneve protocol and sends the modified IP packet back to switch 2200. NIC 2202 may send the modified IP packet back to switch 2200 via a same or different network port from the network port on which NIC 2202 received the IP packet from switch 2200. Switch 2200 may then forward the modified IP packet (i.e., the Geneve packet).

Figure 23:
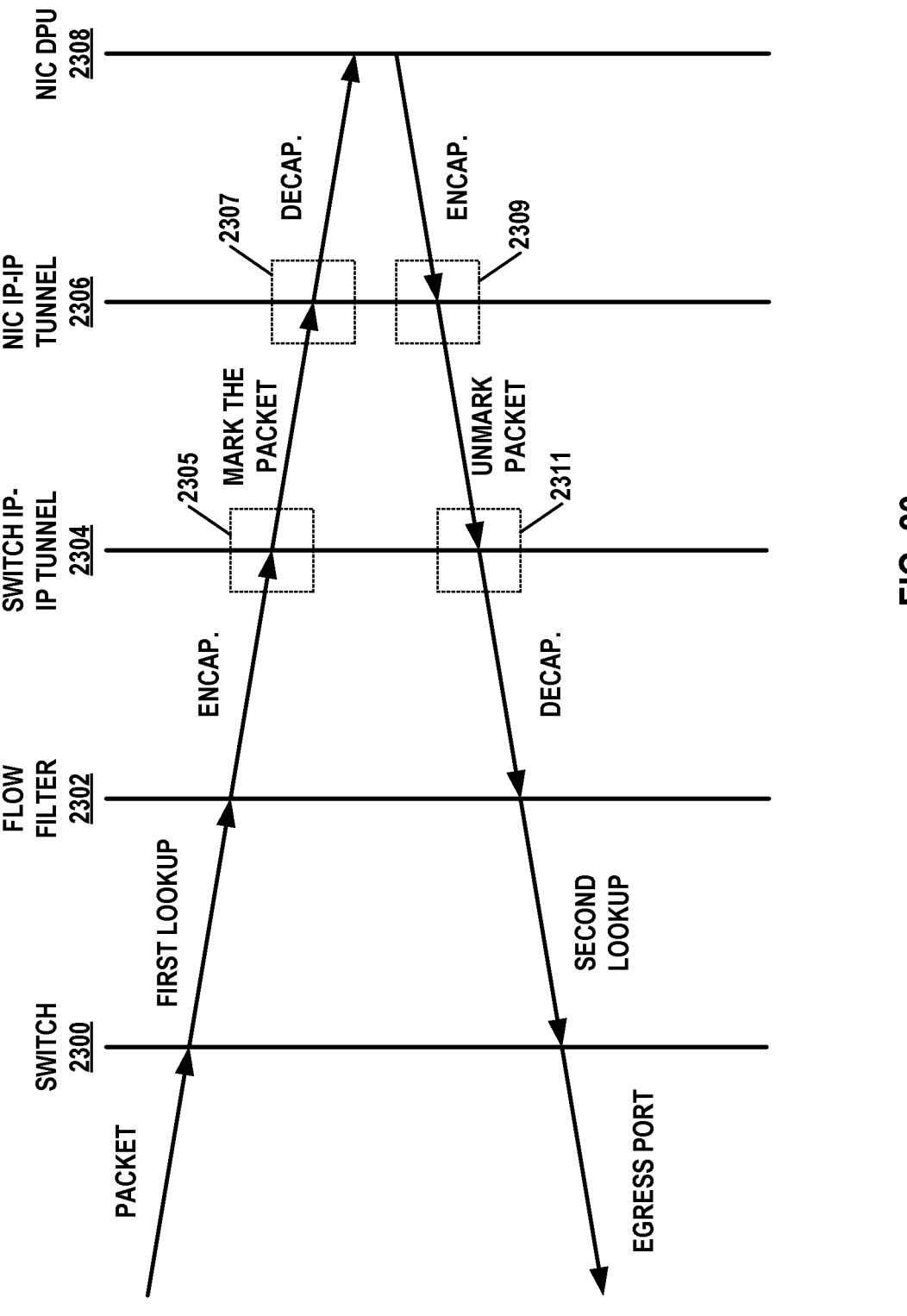
FIG. 23 is a flow diagram illustrating an example flow for packets from a switch to a NIC data processing unit (DPU), according to techniques of this disclosure.

In an ESP fabric, switches and NICs work together to forward packets in the network. When a switch receives a data packet for the first time, if the data packet requires additional processing, flow filters mark the packet and redirect the data packet to one of the NICs in the fabric. After the forwarding plane in the NIC completes the required task (e.g., modifying the data packet), the NIC sends the packet back to the switch to complete the rest of the forwarding. A reserved IP-IP tunnel may be used to mark and unmark a packet traversing between the switch and various NICs. The flow diagram of FIG. 23 gives more details about this process. In other words, FIG. 23 is a flow diagram illustrating an example flow for packets from a switch to a NIC data processing unit (DPU), according to techniques of this disclosure.

In the example of FIG. 23, a switch 2300 receives a data packet. Switch 2300 applies a flow filter 2302 that performs a first lookup to determine whether to send the data packet to a NIC for processing. In some examples, flow filter 2302 may perform the first lookup by comparing data in a header of the data packet to a tuple (e.g., a 5-tuple, N-tuple, etc.). The tuple may include one or more of a source address, a destination address, a source port, a destination port, and a protocol identifier. Flow filter 2302 may be programmed by an ESP controller into switch 2300 for use by a network processor of switch 2300 to identify packets of packet flows that require some packet processing to be outsourced from switch 2300 to a NIC.

If flow filter 2302 causes a determination to send the data packet to the NIC for processing, a switch IP-IP tunnel unit 2304 encapsulates the data packet with an outer header for a tunnel (e.g., IP header for an IP-IP tunnel), marks the data packet, and sends the data packet to an IP-IP tunnel interface of a NIC (NIC IP-IP tunnel unit 2306). An interface of switch IP-IP tunnel unit 2304 that receives the data packet may be referred to as a network interface 2305. In some examples, switch IP-IP tunnel unit 2304 marks the data packet by setting an otherwise-unused bit/flag of the outer IP header. NIC IP-IP tunnel unit 2306 may decapsulate the data packet. In other words, NIC IP-IP tunnel unit 2306 may remove the outer IP header. An interface of NIC IP-IP tunnel unit 2316 that decapsulates the data packet may be referred to as a network interface 2307 and is a logical network interface.

A processing unit of the NIC (NIC DPU 2308) may then modify the data packet. For instance, NIC DPU 2308 may encapsulate the data packet for transmission according to a protocol or, if the data packet is already encapsulated for transmission according to the protocol, NIC DPU 2308 may decapsulate the data packet for transmission using a second protocol or modify the tunnel encapsulation or other header to effectuate the protocol, e.g., to update a label, segment identifier, or destination address.

NIC IP-IP tunnel unit 2306 may encapsulate the modified data packet with an outer IP header and send the modified data packet to switch IP-IP tunnel unit 2306. The outer IP header of the modified data packet may have the same content as the outer IP header of the data packet received by the NIC, but with source and destination addresses and ports reversed. Thus, the outer IP header may be similarly marked as the outer IP header of the data packet received by the NIC. An interface of NIC IP-IP unit 2306 that receives, encapsulates, and sends the modified data packet may be referred to as a network interface 2309 and is a logical network interface. Switch IP-IP tunnel unit 2306 may decapsulate the modified data packet. In other words, switch IP-IP tunnel unit 2306 may remove the outer IP header. An interface of switch IP-IP tunnel unit 2306 that decapsulates the outer IP header may be referred to as a network interface 2311. Switch IP-IP tunnel unit 2306 may unmark the packet. In other words, switch IP-IP tunnel unit 2306 may determine, based on the outer IP header being marked, that switch 2300 should not route the modified data packet back to the NIC for further modification. Switch 2300 may perform a second lookup to determine an egress port for the modified data packet. Switch 2300 may then output the modified data packet via the egress port.

Thus, in the example of FIG. 23, a physical device (e.g., switch 2300) may include a physical network interface and a processing unit. The processing unit is configured to receive a data packet. The processing unit is also configured to apply a flow filter that performs a first lookup to determine whether to send the data packet to a NIC for processing. The NIC has a processing unit coupled to an embedded switch. Based on the flow filter causing a determination to send the data packet to the NIC for processing, the physical device may encapsulate the data packet and send the encapsulated data packet to the NIC via a first network interface (e.g., network interface 2305) of the physical device. In some examples, as part of encapsulating the data packet, the physical device (e.g., switch IP-IP tunnel unit 2304 of switch 2300) may generate an outer header of the data packet and mark the outer header of the data packet to indicate the data packet for modification by the NIC.

The physical device may receive an encapsulated modified data packet from the NIC via a second network interface (e.g., network interface 2311) of the physical device. The physical device (e.g., switch IP-IP tunnel unit 2304) may decapsulate the encapsulated modified data packet to obtain a modified data packet that was modified by the NIC. In some examples, the modified docket data packet is encapsulated for transmission according to a protocol and the physical device is not configured to encapsulate data packets for transmission according to the protocol. In some examples, the modified data packet has a modified segment routing header. The physical device may forward the modified data packet via the physical network interface.

Figure 24:
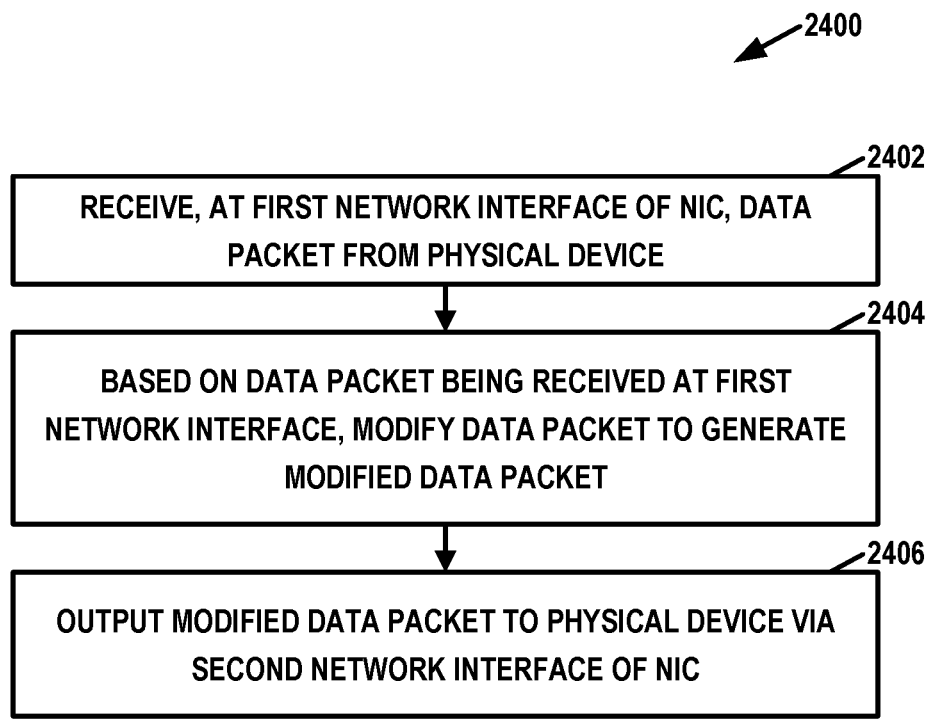
FIG. 24 is a flowchart illustrating an example method according to techniques of this disclosure.

FIG. 24 is a flowchart illustrating an example method 2400 according to techniques of this disclosure. In the example of FIG. 24, a NIC (e.g., one of NICs 2002 (FIG. 20, NIC 2102, NIC 2202, NIC 2300, etc.) may receive, at a first network interface of the NIC, a data packet from a physical device (2402). The first network interface may be an interface at the NIC of an IP-IP tunnel or a tunnel that uses another encapsulation protocol. For instance, the first network interface may be interface 2307 of FIG. 23. Examples of the physical device may comprise at least one of a network switch, network router, firewall, load balancer, network address translation device, physical network function, or network device.

Based on the data packet being received at the first network interface, the NIC may modify the data packet to generate a modified data packet (2404). In some examples, the NIC does not modify the data packet if the data packet is not received at the first network interface. In some examples, the processing unit of the NIC is programmed to, as part of modifying the data packet to generate the modified data packet, encapsulate the data packet for transmission according to a first protocol (e.g., Geneve). In some examples where the data packet is encapsulated for transmission according to the first protocol and the processing unit of the NIC is programmed to, as part of modifying the data packet to generate the modified data packet, decapsulate the data packet for transmission according to a second protocol. In some such examples, the physical device is not equipped for encapsulating data packets for transmission according to the first protocol or decapsulating data packets encapsulated for transmission according to the first protocol. In some examples, such as the example of FIG. 21, the data packet is a SR packet encapsulated according to a CRH protocol. In this example, the processing unit of the NIC is programmed to, as part of modifying the data packet to generate the modified data packet, modify the data packet to be a SR packet with a destination IP address set to a new waypoint.

The NIC may output the modified data packet to the physical device via a second network interface of the NIC (2406). The second network interface may be an interface at the NIC of an IP-IP tunnel or other type of tunnel for transporting data packets from the NIC to the physical device. The first and second network interfaces may be coupled to the same or different physical links to the physical device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
receiving, at an edge services controller that manages data packet routing in a network interface card (NIC) fabric comprising a plurality of servers that each includes a corresponding NIC from a plurality of NICs, resource availability values from the plurality of NICs, wherein the plurality of NICs are coupled by communication links in a NIC fabric topology;
determining, by the edge services controller, a data path for data packets of a flow to be transported using a protocol from a source NIC to a destination NIC, wherein the data path comprises a NIC set that includes at least one NIC, wherein:
the plurality of NICs comprises the source NIC, the destination NIC, and the NIC set,
the data path is determined to cause each NIC of the NIC set to forward data packets of the flow to a successive NIC of the NIC set in the data path so that the data packets of the flow are forwarded to the destination NIC, and
determining the data path comprises selecting the NIC set based on the resource availability values; and
transmitting, by the edge services controller to the source NIC and to each NIC in the NIC set, data path data to cause a processing unit of the source NIC and processing units of each NIC in the NIC set to identify the data packets of the flow using an identifier of the protocol and to forward the data packets of the flow from the source NIC to the destination NIC via the data path, wherein the processing unit of the source NIC and the processing units of each NIC in the NIC set are configured to offload packet processing from a central processing unit (CPU) of a corresponding server of the plurality of servers.

2. The method of claim 1, wherein the data path data identifies the data packets of the flow using a source port of a source application and a destination port of a destination application.

3. The method of claim 2, wherein the source application and the destination application each comprise one of a NIC application or a host application.

4. The method of claim 1, wherein the protocol comprises one or more of a tunneling protocol or a transport layer protocol.

5. The method of claim 1, wherein:
the data path data comprises a flow identifier of the flow and a set of one or more flow parameters for identifying the data packets of the flow,
the set of one or more flow parameters comprises one or more of a source Internet Protocol (IP) address of a source server associated with the source NIC, a destination IP address of a destination server associated with the destination NIC, a source port of a source application that generates application data of the data packets of the flow, a destination port of a destination application, or the identifier of the protocol, and
the data path data sent to the source NIC comprises a mapping from the flow identifier of the flow to a next-hop port identifier of a NIC port of the source NIC.

6. The method of claim 1, further comprising:
receiving, at the edge services controller, updated resource availability values from the plurality of NICs;
determining, based on the updated resource availability values, an updated data path for the data packets of the flow from the source NIC to the destination NIC via an updated NIC set that comprises at least one NIC of the plurality of NICs; and
transmitting, by the edge services controller to the source NIC and to each NIC in the updated NIC set, updated data path data to cause the source NIC and each NIC in the updated NIC set to forward the data packets of the flow from the source NIC to the destination NIC via the updated data path.

7. The method of claim 1, wherein:

the data path is a first data path, the NIC set is a first NIC set, and the data path data is first data path data, and the method further comprises:

determining, by the edge services controller, a second data path for the data packets of the flow transported using the protocol from the source NIC to the destination NIC via a second NIC set, wherein:

the second NIC set includes at least one NIC of the plurality of NICs, and determining the second data path comprises selecting, by the edge services controller, the second NIC set based on the resource availability values; and transmitting, by the edge services controller to the source NIC and to each NIC in the second NIC set, second data path data to cause the processing unit of the source NIC and processing units of each NIC in the second NIC set to identify the data packets of the flow using the identifier of the protocol and to forward the data packets of the flow from the source NIC to the destination NIC via the second data path.

8. The method of claim 7, wherein:

the first NIC set and the second NIC set include a common NIC, transmitting the first data path data comprises transmitting, by the edge services controller, a first next-hop port identifier to the common NIC, and transmitting the second data path data comprises transmitting, by the edge services controller, a second next-hop port identifier to the common NIC to enable the common NIC to implement load balancing by routing the data packets of the flow to the destination NIC via both the first data path using a first NIC port associated with the first next-hop port identifier and the second data path using a second NIC port associated with the second next-hop port identifier.

9. The method of claim 8, wherein:

the first data path data and the second data path data comprise a set of one or more flow parameters and a flow identifier, the set of one or more flow parameters comprises one or more of a source IP address of a source server associated with the source NIC, a destination IP address of a destination server associated with the destination NIC, a source port address of a source application configured to generate application data to be transported in the data packets of the flow, a destination port address of a destination application configured to receive the data packets of the flow, or the identifier of the protocol associated with the protocol, the source application operates at the source server, the flow identifier corresponds to the first next-hop port identifier and the second next-hop port identifier to enable the common NIC to route data packets of the flow that include the set of one or more flow parameters via the first NIC port and the second NIC port, and a relationship between the flow identifier and the first and second next-hop port identifiers is defined in a common look-up table previously provided to the common NIC by the edge services controller.

10. The method of claim 1, wherein:

the data path is a first data path, the NIC set is a first NIC set, the flow is a first flow, and the data path data is first data path data, and the method further comprises:

determining, by the edge services controller, a second data path for data packets of a second flow transported using a second protocol from the source NIC to the destination NIC via a second NIC set, wherein:

the second NIC set comprises one or more NICs of the plurality of NICs different from the NICs in the first NIC set, and determining the second data path comprises selecting, by the edge services controller, the second NIC set based on the resource availability values associated with the plurality of NICs; and transmitting, by the edge services controller to the source NIC and to each NIC in the second NIC set, second data path data to cause the processing unit of the source NIC and processing units of each NIC in the second NIC set to identify the data packets of the second flow using an identifier of the second protocol and to forward the data packets of the second flow from the source NIC to the destination NIC via the second data path, wherein the identifier of the second protocol identifies the second protocol.

11. The method of claim 10, wherein:

the second data path data comprises a second set of one or more flow parameters for identifying data packets of the second flow and a flow identifier of the second flow, the second set of flow parameters comprises one or more of a source IP address of a source server associated with the source NIC, a destination IP address of a destination server associated with the destination NIC, a source port address of a second source application that generates application data of the data packets of the second flow, a destination port address of a second destination application, or the identifier of the second protocol, and the second data path data comprises a mapping from the flow identifier of the second flow to a next-hop port identifier of a NIC port of the source NIC.

12. The method of claim 1, wherein the data path does not include a physical switch other than NICs of the plurality of NICs.

13. A network interface card (NIC) comprising:

a NIC port;

a processing unit configured to offload packet processing from one or more central processing units (CPUs) of a server of a plurality of servers; and a memory comprising instructions that, when executed by the processing unit, cause the NIC to:

transmit a resource availability value of the NIC to an edge services controller, wherein the edge services controller manages data packet routing in a NIC fabric comprising the plurality of servers, wherein each server of the plurality of servers includes a corresponding NIC from a plurality of NICs, wherein the plurality of NICs are coupled by communication links in a NIC fabric topology;

receive, from the edge services controller, data path data associated with a data path for data packets of a flow to be transported using a protocol from a source NIC in the NIC fabric to a destination NIC in the NIC fabric, wherein the data path comprises a NIC set that includes the NIC, wherein the data path is determined to cause each NIC of the NIC set to forward the data packets of the flow to a successive NIC of the NIC set in the data path so that the data packets of the flow are forwarded to the destination NIC, wherein the data path is computed using the resource availability value of the NIC and the data path data comprises a flow identifier of the flow mapped to a next-hop port identifier of the NIC port, and wherein the data path data comprises a set of one or more flow parameters for identifying data packets of the flow using an identifier of the protocol;

receive a data packet of the flow;

map, based on the data path data, the data packet to the flow identifier of the flow; and forward, based on the data path data and the flow identifier of the flow, the data packet via the NIC port.

14. The NIC of claim 13, wherein the data path data identifies the data packets of the flow using a source port of a source application and a destination port of a destination application.

15. The NIC of claim 13, wherein:

the data path data comprises the next-hop port identifier and the flow identifier of the flow, the set of one or more flow parameters comprises one or more of a source Internet Protocol (IP) address of a source server associated with the source NIC, a destination IP address of a destination server associated with the destination NIC, a source port of a source application that generates application data of the data packets of the flow, or a destination port of a destination application, and the data path data comprises a mapping from the flow identifier of the flow to the next-hop port identifier of the NIC port.

16. The NIC of claim 15, wherein:

the data path is a first data path, the data path data is first data path data, and the next-hop port identifier is a first next-hop port identifier, the NIC further comprises a second NIC port, and the memory further comprises instructions that, when executed by the processing unit, configure the processing unit to:

receive, from the edge services controller, second data path data associated with a second data path for the data packets of the flow, the second data path data comprising the flow identifier of the flow mapped to a second next-hop port identifier;

receive a second data packet of the flow;

map, based on the second data path data, the second data packet to the flow identifier of the flow; and forward, based on the second data path data and the flow identifier of the flow, the second data packet via the second NIC port.

17. The NIC of claim 16, wherein:

the second data path data comprises the set of one or more flow parameters and the second next-hop port identifier, and the flow identifier of the flow corresponds to both the first next-hop port identifier and the second next-hop port identifier to enable the NIC to implement load balancing by routing data packets of the flow to the destination NIC via both the first data path and the second data path.

18. A system comprising:

a network interface card (NIC) fabric comprising a plurality of servers, wherein each server of the plurality of servers includes a corresponding NIC from a plurality of NICs, and wherein the plurality of NICs are coupled by communication links in a NIC fabric topology; and an edge services controller that manages data packet routing in the NIC fabric, the edge services controller configured to:

receive resource availability values from the plurality of NICs;

determine a data path for data packets of a flow to be transported using a protocol from a source NIC to a destination NIC, wherein the data path comprises a NIC set that includes at least one NIC, wherein:

the plurality of NICs comprises the source NIC, the destination NIC, and the NIC set, the data path is determined to cause each NIC of the NIC set to forward data packets of the flow to a successive NIC of the NIC set in the data path so that the data packets of the flow are forwarded to the destination NIC, and the edge services controller is configured to select the NIC set based on the resource availability values; and transmit, to the source NIC and to each NIC in the NIC set, data path data to cause a processing unit of the source NIC and processing units of each NIC in the NIC set to identify the data packets of the flow using an identifier of the protocol and to forward the data packets of the flow from the source NIC to the destination NIC via the data path, wherein the processing unit of the source NIC and the processing units of each NIC in the NIC set are configured to offload packet processing from a central processing unit (CPU) of a corresponding server of the plurality of servers.

19. The system of claim 18, wherein the data path data identifies the data packets of the flow using a source port of a source application and a destination port of a destination application.

20. The system of claim 18, wherein the edge services controller is further configured to:

receive updated resource availability values from the plurality of NICs in the NIC fabric;

determine, based on the updated resource availability values, an updated data path for the data packets of the flow from the source NIC to the destination NIC via an updated NIC set that comprises at least one NIC of the plurality of NICs; and transmit, to the source NIC and to each NIC in the updated NIC set, updated data path data to cause the source NIC and each NIC in the updated NIC set to forward the data packets of the flow from the source NIC to the destination NIC via the updated data path.

* * * * *